US011881116B2

(12) United States Patent
Wissler et al.

(10) Patent No.: US 11,881,116 B2
(45) Date of Patent: Jan. 23, 2024

(54) AERIAL VEHICLE NAVIGATION SYSTEM

(71) Applicant: Aurora Flight Sciences Corporation, Manassas, VA (US)

(72) Inventors: John Brooke Wissler, Waltham, MA (US); Eugene H. Nahm, Boston, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 180 days.

(21) Appl. No.: 16/670,038

(22) Filed: Oct. 31, 2019

(65) Prior Publication Data

US 2021/0134163 A1 May 6, 2021

(51) Int. Cl.
*G05D 1/10* (2006.01)
*G08G 5/00* (2006.01)
(52) U.S. Cl.
CPC ........... *G08G 5/0039* (2013.01); *G05D 1/104* (2013.01); *G08G 5/0008* (2013.01); *G08G 5/0013* (2013.01); *G08G 5/0069* (2013.01)
(58) Field of Classification Search
CPC .... G05D 1/104; G08G 5/0008; G08G 5/0013; G08G 5/0039; G08G 5/0069
See application file for complete search history.

(56) References Cited

U.S. PATENT DOCUMENTS

| 8,038,062 | B2 | 10/2011 | Kenefic |
| 8,437,890 | B2 | 5/2013 | Anderson et al. |
| 9,262,929 | B1 | 2/2016 | Roy et al. |
| 9,557,742 | B2 | 1/2017 | Paduano et al. |

(Continued)

FOREIGN PATENT DOCUMENTS

| JP | H11 139396 A | 5/1999 |
| JP | 3 438 949 A1 | 2/2019 |
| WO | 2018/195573 A1 | 11/2018 |

OTHER PUBLICATIONS

Dubins, L.E. (Jul. 1957). "On Curves of Minimal Length with a Constraint on Average Curvature, and with Prescribed Initial and Terminal Positions and Tangents," American Journal of Mathematics. 79 (3): 497-516.

(Continued)

*Primary Examiner* — Jeff A Burke
*Assistant Examiner* — Zachary Joseph Wallace
(74) *Attorney, Agent, or Firm* — Amanda C. Jackson; McAndrews, Held & Malloy, Ltd.

(57) ABSTRACT

In one example, a method of operating a plurality of aerial vehicles in an environment includes receiving, at a first command module of a first aerial vehicle navigating along a first flight path, sensor data from one or more sensors on board the first aerial vehicle. The sensor data reflects one or more characteristics of the environment. The method further includes determining, via the first command module, a change from a predetermined formation to a different formation for a second aerial vehicle based at least in part on the sensor data, where the predetermined formation and the different formation are relative to the first aerial vehicle. The method also including generating, via the first command module, control signals reflecting the change from the predetermined formation to the different formation and sending the control signals from the first aerial vehicle to the second aerial vehicle.

21 Claims, 12 Drawing Sheets

(56) References Cited

U.S. PATENT DOCUMENTS

| | | | |
|---|---|---|---|
| 2005/0230563 A1 | 10/2005 | Corcoran, III | |
| 2010/0145556 A1 | 6/2010 | Christenson et al. | |
| 2014/0074339 A1 | 3/2014 | Casado et al. | |
| 2015/0100194 A1 | 4/2015 | Terada | |
| 2015/0120126 A1* | 4/2015 | So | G01C 23/00 701/26 |
| 2017/0053535 A1* | 2/2017 | Lee | G08G 5/045 |
| 2017/0131726 A1 | 5/2017 | Speyer et al. | |
| 2017/0168485 A1 | 6/2017 | Berntorp et al. | |
| 2017/0193830 A1 | 7/2017 | Fragoso et al. | |
| 2017/0293307 A1* | 10/2017 | Frolov | B64C 13/16 |
| 2018/0074499 A1 | 3/2018 | Cantrell et al. | |
| 2018/0074520 A1 | 3/2018 | Liu et al. | |
| 2018/0101171 A1* | 4/2018 | Lemmer | H04L 67/12 |
| 2018/0136670 A1* | 5/2018 | Gurdan | B64D 47/06 |
| 2018/0188724 A1* | 7/2018 | Jassowski | G05D 1/0027 |
| 2019/0080621 A1* | 3/2019 | Guerrini | G05D 1/104 |
| 2019/0094889 A1* | 3/2019 | Pohl | G08G 5/00 |
| 2019/0118944 A1* | 4/2019 | Kimchi | G05D 1/104 |
| 2019/0236963 A1* | 8/2019 | High | B64C 39/024 |
| 2019/0324456 A1 | 10/2019 | Ryan et al. | |
| 2020/0201331 A1* | 6/2020 | Hortner | B64C 39/02 |

OTHER PUBLICATIONS

Satyanarayana G. Manyam, Sivakumar Rathinam, David Casbeer, Eloy Garcia, "Shortest Paths of Bounded Curvature for the Dubins Interval Problem," https://www.researchgate.net/publication/280497994, Jul. 2015.

Sertac Karaman ,Emilio Frazzoli, "Incremental Sampling-based Algorithms for Optimal Motion Planning", arXiv:1005.0416v1, May 3, 2010.

Extended European search report for EU application No. 19170383.4, dated Sep. 23, 2019.

Mehra R K et al: "Autonomous formation flying of multiple UCAVs under communication failure," Mar. 13, 2000; Mar. 13-16, 2000, Mar. 13, 2000 (Mar. 13, 2000), pp. 371-378, XP010376960.

The extended European search report, dated Feb. 11, 2021 for EU application No. 20198901.9, European Patent Office, Germany (10 pages).

Communication pursuant to Article 94(3) EPC for European Application No. 20198901.9, dated Feb. 28, 2022, European Patent Office, Munich (8 pages).

Examination report for Application No. 20 198 901.9, dated Sep. 27, 2022, European Patent Office, Germany (9 pages).

* cited by examiner

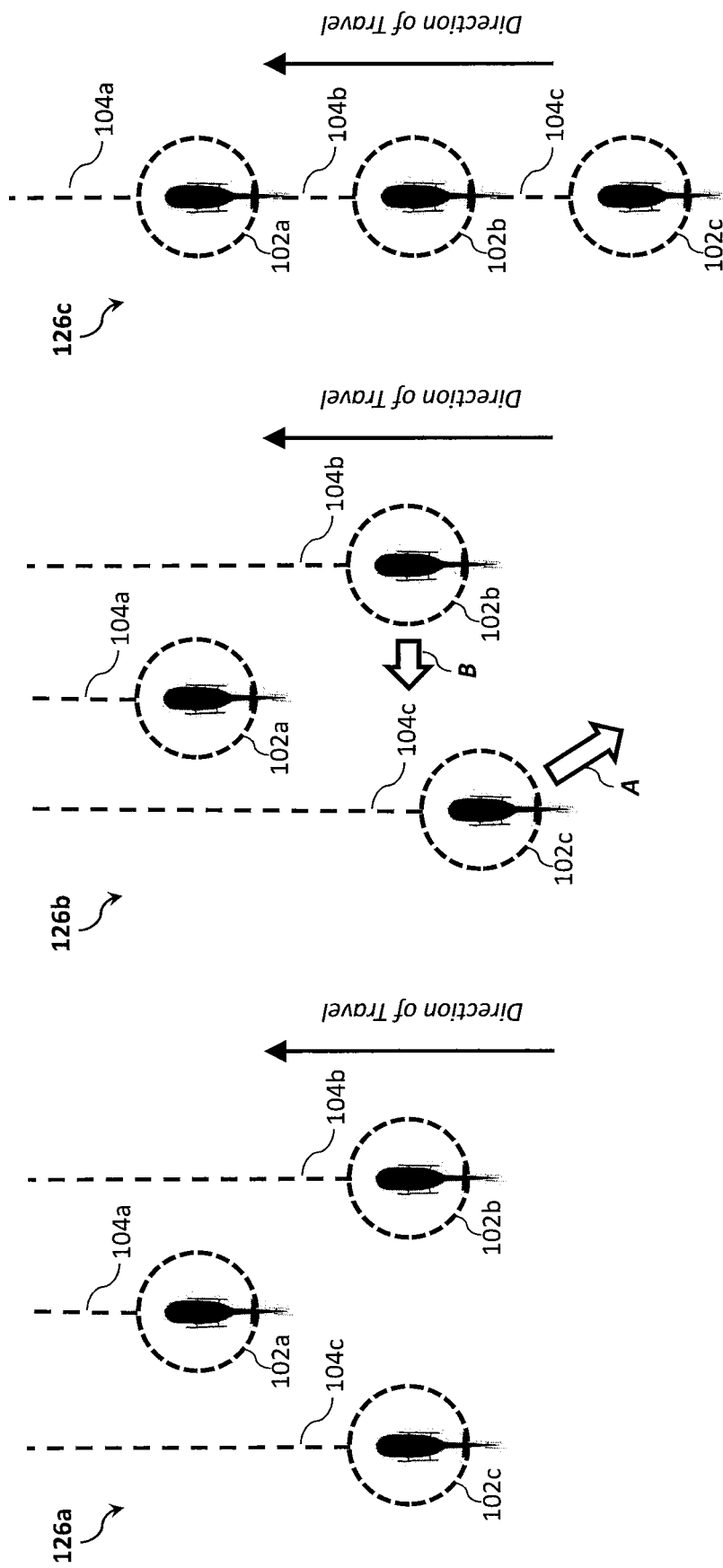

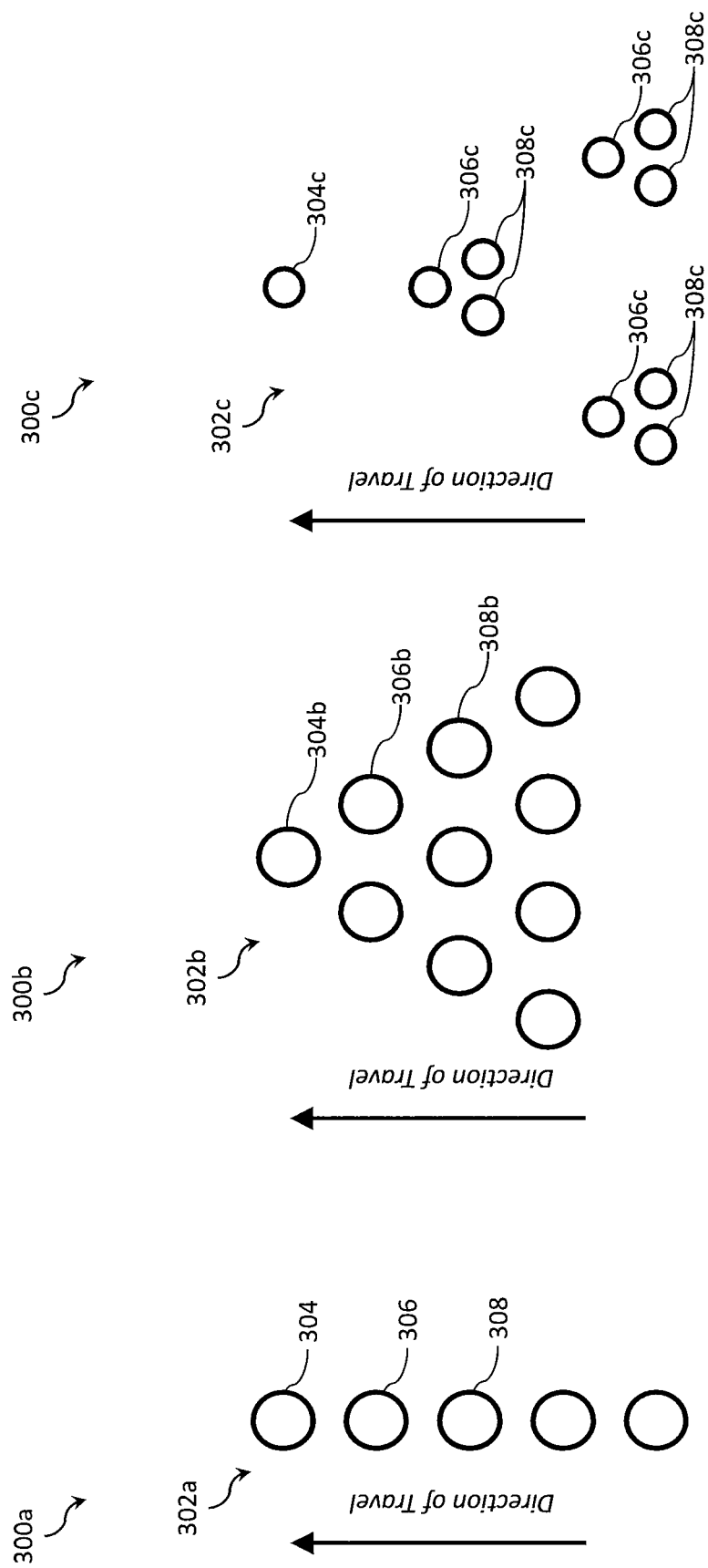

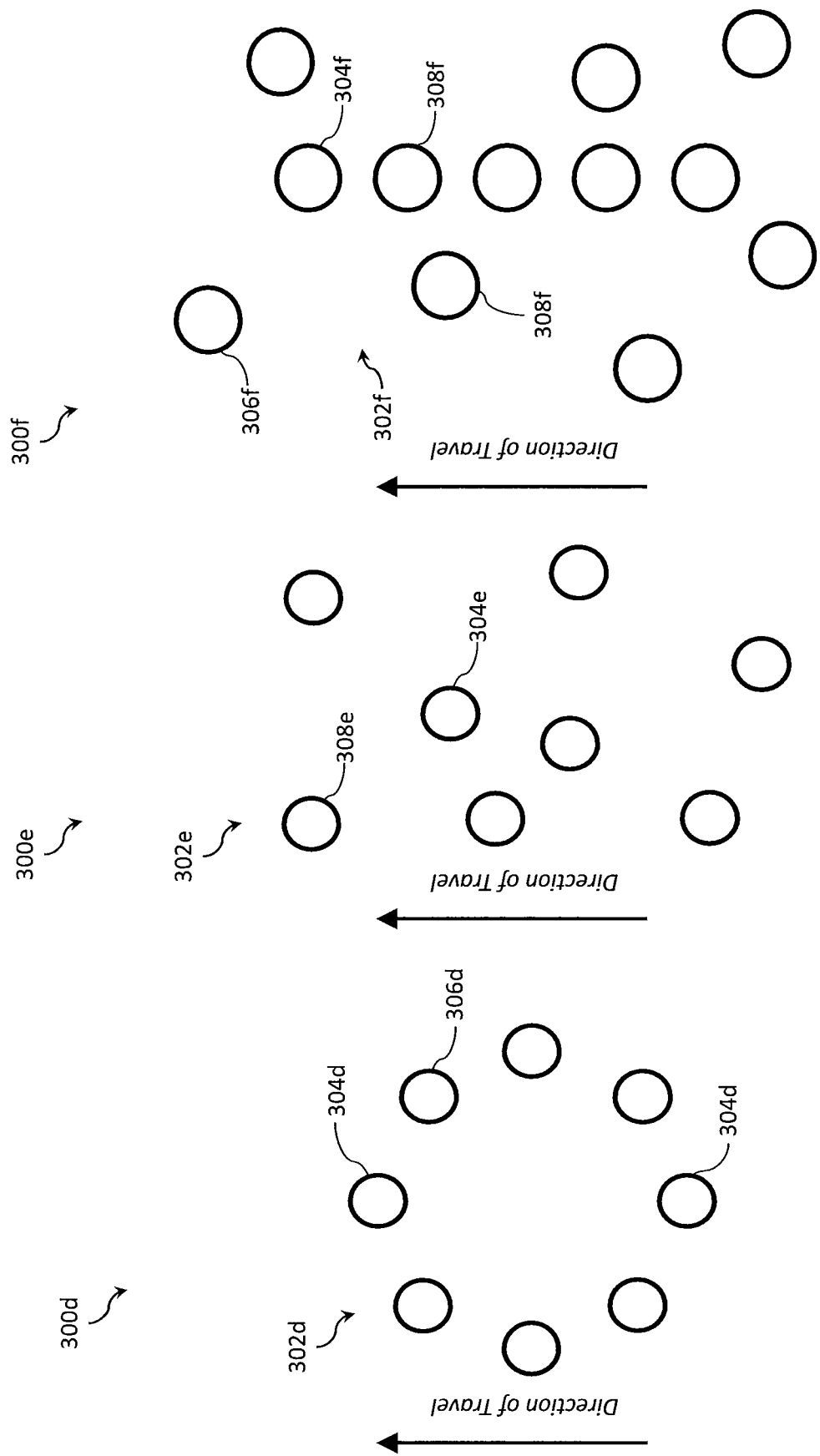

AERIAL VEHICLE NAVIGATION SYSTEM

FIELD

The present disclosure is directed to a system, method, and communication system for controlling unmanned and optionally-manned aerial vehicles.

BACKGROUND

Aerial vehicles may be utilized for a variety of operations, such as, for example, military or civilian operations. In some operations, the use of an unmanned aerial vehicle may be safer and more efficient than solely relying on using a manned aerial vehicle. For example, humanitarian relief operations, rescue operations, cargo delivery, or the like may be completed under hazardous field conditions and/or with minimal infrastructure, exposing personnel associated with manned operations to a risk of harm. Utilization of unmanned aerial vehicles for such missions may help reduce the risk of harm to personnel because unmanned aerial vehicles do not require a dedicated pilot to complete the operation. For instance, some unmanned aerial vehicles are configured to autonomously sense and respond to hazardous and unpredictable environments. Moreover, the use of unmanned aerial vehicles may increase the efficiency of one or more operations by allowing personnel to focus on operations other than, or in addition to, the aerial mission. Introducing an unmanned vehicle, without direct control by a human operator, to an operation requires a safe, adaptable, and perceptive control logic and communication model. A cautious approach is desirable in designing a reliable communication network and control schema for executing an autonomous or semi-autonomous operation of aerial vehicles.

SUMMARY

The present disclosure provides a system, method, and communication system for controlling unmanned and optionally-manned aerial vehicles.

According to a first aspect, a method of operating a plurality of aerial vehicles in an environment comprises: receiving, at a first command module of a first aerial vehicle navigating along a first flight path, sensor data from one or more sensors on board the first aerial vehicle, wherein the sensor data reflects one or more characteristics of the environment; determining, via the first command module, a change from a predetermined formation to a different formation for a second aerial vehicle based at least in part on the sensor data, wherein the predetermined formation and the different formation are relative to the first aerial vehicle; generating, via the first command module, control signals reflecting the change from the predetermined formation to the different formation; and sending the control signals from the first aerial vehicle to the second aerial vehicle.

In certain aspects, the method further comprises the step of: determining, via the first command module or a mission manager, a second flight path for a second aerial vehicle reflecting the change from the predetermined formation to the different formation, wherein the control signals reflect the second flight path for the second aerial vehicle.

In certain aspects, the method further comprises the steps of: receiving, at the first command module, feedback from the second aerial vehicle; and determining, via the first command module, an updated flight path for the second aerial vehicle, for changing to the different formation, based at least in part on the feedback.

In certain aspects, the method further comprises the step of: maneuvering, via a second command module of the second aerial vehicle, the second aerial vehicle to navigate along the second flight path.

In certain aspects, the control signals comprise a first flight command to divert the second aerial vehicle from a flight path associated with the predetermined formation and to follow the second flight path, the method further comprising the steps of: maneuvering, via the second command module of the second aerial vehicle, the second aerial vehicle to navigate along the second flight path; and receiving, via the second command module and from the first command module, a second flight command to return the second aerial vehicle from the second flight path to the flight path associated with the predetermined formation.

In certain aspects, the method further comprises the steps of: receiving, via the second command module, an alert signal; initiating, via the second command module, a dispersion pattern flight path, wherein the dispersion pattern flight path is different than the second flight path; maneuvering, via the second command module of the second aerial vehicle, the second aerial vehicle to navigate along the dispersion pattern flight path; and receiving, via the second command module, a termination alert, wherein the termination alert causes the second command module to instruct the second aerial vehicle to return to the second flight path.

In certain aspects, the method further comprises the steps of: receiving, via the second command module and from the first command module, zone data that indicates one or more zones proximate the second flight path; and maneuvering, via the second command module, the second aerial vehicle to enter the one or more zones based at least in part on the zone data.

In certain aspects, the different formation is a second predetermined formation relative to the first aerial vehicle that is different from the predetermined formation.

In certain aspects, the method further comprises the steps of: receiving, from the first command module and by a second command module of the second aerial vehicle, the control signals; generating, based on the control signals, a second flight path for the second aerial vehicle reflecting the change from the predetermined formation to the different formation; and maneuvering, via the second command module, the second aerial vehicle to navigate along the second flight path.

In certain aspects, the method further comprises the steps of: tracking, via a second command module of the second aerial vehicle, a position of the first aerial vehicle to yield a tracked position; and maneuvering, via the second command module, the second aerial vehicle to follow the first aerial vehicle based on the control signals and the tracked position of the first aerial vehicle.

In certain aspects, the method further comprises the step of receiving, at the first command module, additional sensor data from one or more additional sensors on board the second aerial vehicle that is different from the one or more sensors.

In certain aspects, the sensor data comprises at least one of weather data, location data, obstacle data, mapping data, payload data, formation data, and landing data.

In certain aspects, the change from the predetermined formation to the different formation comprises a first change, the method further comprising the steps of: determining, via the first command module, a second change from the predetermined formation to the different formation for a third aerial vehicle based at least in part on the sensor data, wherein the second change is different than the first change; generating, via the first command module, second control signals reflecting the second change from the predetermined formation to the different formation; and sending the second control signals from the first aerial vehicle to the third aerial vehicle.

In certain aspects, the control signals are configured to enable autonomous control of the second aerial vehicle and the third aerial vehicle to maintain the different formation, wherein the different formation is a predetermined aerial formation relative to the first aerial vehicle.

In certain aspects, the sensor data comprises data from a second set of sensors, on board the second aerial vehicle, different than the one or more sensors.

According to a second aspect, an autonomous aerial vehicle navigation system for operating a plurality of aerial vehicles in an environment comprises: one or more sensors configured to generate sensor data reflecting one or more characteristics of the environment, wherein the one or more sensors are on board a first aerial vehicle; and a first command module disposed on board the first aerial vehicle and configured to: determine a change from a predetermined formation to a different formation for a second aerial vehicle based at least in part on the sensor data, wherein the predetermined formation and different formation are relative to the first aerial vehicle; generate control signals reflecting the change from the predetermined formation to the different formation; and send the control signals from the first aerial vehicle to the second aerial vehicle.

In certain aspects, the autonomous aerial vehicle navigation system further comprises: a mission manager, wherein the first command module or the mission manager is configured to determine a second flight path for the second aerial vehicle reflecting the change from the predetermined formation to the different formation, wherein the control signals reflect the second flight path for the second aerial vehicle.

In certain aspects, at least one of the first command module or mission manager is further configured to: receive feedback from the second aerial vehicle; and determine an updated flight path for the second aerial vehicle, for changing to the different formation, based at least in part on the feedback.

In certain aspects, the autonomous aerial vehicle navigation system further comprises: a second command module disposed on board the second aerial vehicle, wherein the second command module is configured to: maneuver the second aerial vehicle to navigate along the second flight path.

In certain aspects, the control signals comprise a first flight command to divert the second aerial vehicle from a flight path associated with the predetermined formation and to follow the second flight path, and wherein the second command module is further configured to: maneuver the second aerial vehicle to navigate along the second flight path; and receive, from the first command module, a second flight command to return the second aerial vehicle from the second flight path to the flight path associated with the predetermined formation.

In certain aspects, the second command module is further configured to: receive an alert signal; initiate a dispersion pattern flight path, wherein the dispersion pattern flight path is different than the second flight path; maneuver the second aerial vehicle to navigate along the dispersion pattern flight path; and receive a termination alert, wherein the termination alert causes the second command module to instruct the second aerial vehicle to return to the second flight path.

In certain aspects, the second command module is further configured to: receive, from the first command module, zone data that indicates one or more zones proximate the second flight path; and maneuver the second aerial vehicle to enter the one or more zones based at least in part on the zone data.

In certain aspects, the autonomous aerial vehicle navigation system is further configured to: receive, from the first command module, the control signals; generate based on the control signals, a second flight path for the second aerial vehicle reflecting the change from the predetermined formation to the different formation; and maneuver the second aerial vehicle to navigate along the second flight path.

In certain aspects, the second command module is further configured to: track a position of the first aerial vehicle to yield a tracked position; and maneuver the second aerial vehicle to follow the first aerial vehicle based on the control signals and the tracked position of the first aerial vehicle.

In certain aspects, the sensor data comprises at least one of weather data, location data, obstacle data, mapping data, payload data, formation data, and landing data.

In certain aspects, the change from the predetermined formation to the different formation comprises a first change, wherein the first command module is further configured to: determine a second change from the predetermined formation to the different formation for a third aerial vehicle based at least in part on the sensor data, wherein the second change is different than the first change; generate second control signals reflecting the second change from the predetermined formation to the different formation; and send the second control signals from the first aerial vehicle to the third aerial vehicle.

In certain aspects, the control signals are configured to enable autonomous control of the second aerial vehicle and the third aerial vehicle to maintain the different formation, wherein the different formation is a predetermined aerial formation relative to the first aerial vehicle.

In certain aspects, the sensor data comprises first sensor data, wherein the one or more sensors on board the first aerial vehicle comprises a first set of sensors, the system further comprising: a second set of sensors on board the second aerial vehicle, wherein the second set of sensors are different than the first set of sensors, wherein the second command module is further configured to: receive second sensor data from the second set of sensors, wherein the second sensor data reflects one or more characteristics of the environment, and wherein the second change is based on the first sensor data and the second sensor data.

In certain aspects, the one or more sensors comprises an optical sensor and a non-optical sensor, where the sensor data is generated as a function of data from each of the optical sensor and the non-optical sensor.

In certain aspects, the one or more sensors includes a forward-facing optical sensor and a rear-facing optical sensor.

According to a third aspect, a communication system for use in operating a plurality of aerial vehicles in an environment comprises: a first command module configured to: determine a change from a predetermined formation to a different formation for a second aerial vehicle based at least in part on sensor data, wherein the predetermined formation and the different formation are relative to a first aerial vehicle, generate control signals reflecting the change from the predetermined formation to the different formation, and send the control signals from the first aerial vehicle to a second command module of the second aerial vehicle; and the second command module, wherein the second command module is configured to: receive the control signals, and maneuver the second aerial vehicle to navigate along a flight path.

In certain aspects, the communication system further comprises a mission manager, wherein the first command module is configured to send the control signals to the second command module via the mission manager.

In certain aspects, at least one of the first command module, the second command module, or the mission manager is configured to: generate, based on the control signals, the flight path for the second aerial vehicle reflecting the change from the predetermined formation to the different formation.

In certain aspects, at least one of the first command module or the mission manager is further configured to: receive feedback from the second command module; and determine an updated flight path for the second aerial vehicle, for changing to the different formation, based at least in part on the feedback.

In certain aspects, the control signals comprise at least one of: a flight command to divert the second aerial vehicle from the flight path and follow an modified flight path, an alert signal to initiate a dispersion pattern flight path, a termination alert to instruct the second aerial vehicle to return to the flight path, or zone data that indicates one or more zones proximate the flight path that can be used for navigation, wherein the second command module is further configured to: maneuver the second aerial vehicle to navigate based on the flight command, alert signal, termination alert, or zone data.

In certain aspects, the change from the predetermined formation to the different formation comprises a first change, the system further comprising: a third command module, wherein the first command module is further configured to: determine a second change from the predetermined formation to the different formation for a third aerial vehicle based at least in part on the sensor data, wherein the second change is different than the first change; generate second control signals reflecting the second change from the predetermined formation to the different formation; and send the second control signals from the first aerial vehicle to the third command module, and wherein the third command module is configured to: receive the second control signals, and maneuver the third aerial vehicle to navigate based on the control signals.

In certain aspects, the control signals are configured to enable autonomous control of the second aerial vehicle and the third aerial vehicle to maintain the different formation, wherein the different formation is a predetermined aerial formation relative to the first aerial vehicle.

DRAWINGS

The foregoing and other objects, features, and advantages of the devices, systems, and methods described herein will be apparent from the following description of particular embodiments thereof, as illustrated in the accompanying figures; where like reference numbers refer to like structures. The figures are not necessarily to scale, emphasis instead being placed upon illustrating the principles of the devices, systems, and methods described herein.

FIGS. 1b through 1d are top plan schematic diagrams illustrating the transition of the plurality of aerial vehicles between formations.

FIGS. 3a through 3f are schematic diagrams illustrating example predetermined formations for the plurality of aerial vehicles.

DESCRIPTION

Figure 1A:
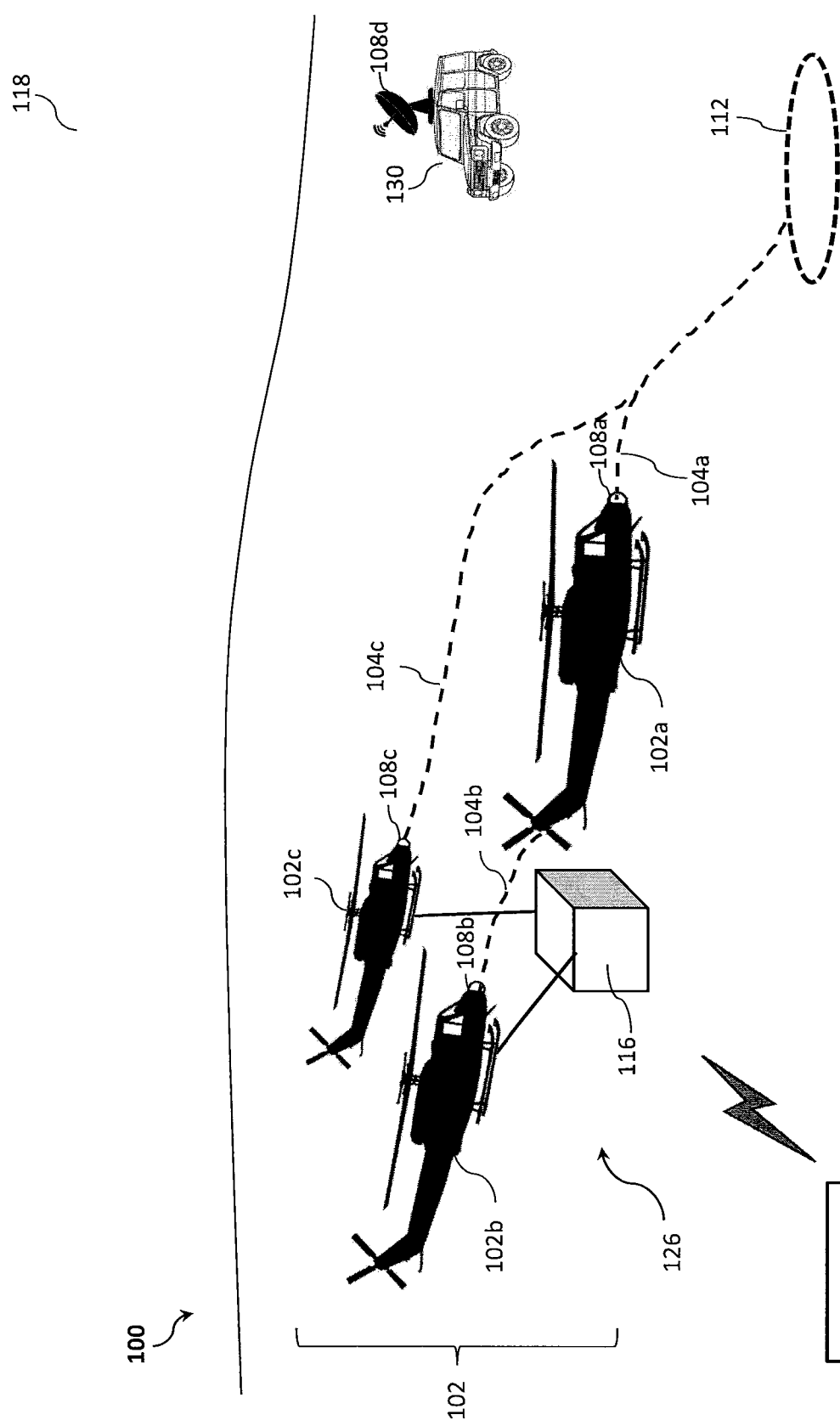
FIG. 1a is a schematic diagram illustrating an example autonomous aerial vehicle navigation system including a plurality of aerial vehicles operating in an environment.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms.

As used herein, the terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

As used herein, the terms "aerial vehicle" and "aircraft" are used interchangeably and refer to a machine capable of flight, including, but not limited to, both traditional runway and vertical takeoff and landing (VTOL) aircraft, and also including both manned and unmanned aerial vehicles.

VTOL aircraft may include fixed-wing aircraft, rotorcraft (e.g., helicopters, multirotor, etc.), and/or tilt-rotor/tilt-wing aircraft.

As used herein, the term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

As used herein, the terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications media, system, channel, network, device, wire, cable, fiber, circuit, and/or link.

As used herein, the terms "exemplary" and "example" mean "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the disclosure", "embodiments," or "disclosure" do not require that all embodiments of the disclosure include the discussed feature, advantage or mode of operation.

As used herein, the terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

As used herein, the term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

As used herein, the term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

As used herein, the term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

As used herein, the term "network" as used herein includes both networks and inter-networks of all kinds, including the Internet, and is not limited to any particular network or inter-network.

As used herein, the term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

Disclosed herein is an aerial vehicle (e.g., an unmanned, optionally-manned, or manned vehicle) that can be employed in connection with flight operations. The following description will be in reference to one or more flight operations. For example, the systems, methods, and examples discussed herein may be used for surveillance and package delivery operations to a residence, business, or in another civilian context. In other examples, the described systems, methods, and examples may be used for a different operation.

In some examples, it may be desirable to employ a plurality of aerial vehicles (e.g., two or more aerial vehicles) to complete an operation. For example, a plurality of aerial vehicles may enable delivery of heavier loads, completion of additional missions, collaborative operations, or the like. However, the use of a plurality of aerial vehicles can be expensive, inefficient, and difficult to operate. For instance, each aerial vehicle of the plurality of aerial vehicles may be equipped with sophisticated sensor systems, processing systems, and communication systems to enable the plurality of aerial vehicles to operate as a unit. In some such examples, each aerial vehicle may sense environmental conditions and determine or adjust a flight path based on the sensed conditions. In this way, one or more aerial vehicles of the plurality of aerial vehicles may sense different environmental conditions, resulting in differing or nonsynchronous flight paths of the plurality of aerial vehicles. Such nonsynchronous flight paths may make the mission less efficient, more complicated, and even more dangerous than a plurality of aerial vehicles operating as a substantially synchronized unit.

The autonomous aerial vehicle navigation system of the present disclosure may include one or more aerial vehicles of a plurality of aerial vehicles configured to communicate with one or more other aerial vehicles of the plurality of aerial vehicles to determine or update flight paths, provide command signals, control the aerial vehicles, identify hazards or environmental conditions, or otherwise provide information relevant to the aerial operation. In this way, one or more of the aerial vehicles of the plurality of aerial vehicles may exhibit different functionalities, sensing capabilities, computing capabilities, or other differences than another aerial vehicle of the plurality of aerial vehicles and may receive such information from the more sophisticated aerial vehicle. In other words, in some examples, at least one aerial vehicle of the plurality of aerial vehicles may sense or learn information reflecting one or more characteristics of the environment and share such information with one or more other aerial vehicles of the plurality of aerial vehicles, enabling the shared information to be used to control operation of plurality of aerial vehicles. In turn, the fleet or pack of the plurality of aerial vehicles may be less expensive, more efficient, more robust, easier to operate, more synchronous, and/or safer than a single aerial vehicle or a plurality of aerial vehicles not operated by the autonomous aerial vehicle navigation system described herein.

FIG. 1a illustrates a schematic diagram of an example autonomous aerial vehicle navigation system (AAVNS) 100 including a plurality of aerial vehicles 102 operating in an environment 118. The plurality of aerial vehicles 102 includes two or more aerial vehicles (illustrated as three aerial vehicles—first, second, and third aerial vehicles 102a, 102b, 102c). Although FIG. 1a will be described with respect to a first aerial vehicle 102a, a second aerial vehicle 102b, and a third aerial vehicle 102c, the plurality of aerial vehicles 102 may include any suitable number of aerial vehicles, such as, for example, two aerial vehicles, three aerial vehicles, six aerial vehicles, ten aerial vehicles, or twelve or more aerial vehicles, for conducting a operation. In addition, although the aerial vehicles 102 depicted in FIG. 1a are aerial vehicles, it will be understood that the autonomous vehicles described herein may include any vehicle, device, component, element, etc., that may be usefully navigated using the principles of the system disclosed herein, including, without limitation, any unmanned vehicle, optionally-manned vehicle, manned vehicle, aircraft, ground vehicle, aquatic vehicle, space vehicle, remote-controlled vehicle, large vehicle, small vehicle, etc., unless explicitly stated otherwise or made clear from the text.

In some examples, an AAVNS 100 including a plurality of aerial vehicles 102 is configured to complete one or more missions. For example, AAVNS 100 can be configured to complete one or more operations including humanitarian relief operations, rescue operations, cargo delivery, or a combination thereof. As a specific example of a mission (an example of which is in FIG. 1a), second and third aerial vehicles 102b, 102c are carrying a payload 116 to be delivered to a landing zone 112. In some examples, payload 116 may include supplies to be delivered to a company, platoon, or squad. In another example, payload 116 may include food, medication, medical equipment, or the like for delivery of humanitarian relief. In other examples, payload 116 may include any suitable payload, including other vehicles (whether aerial or ground-based vehicles). In another example, the plurality of aerial vehicles 102 is configured to complete one or more delivery operations, payload 116 may include a package for delivery to a residence or business. While the payload 116 of FIG. 1a is illustrated as a suspended cargo, one of skill in the art would recognize that other arrangements are possible and the disclosure should not be construed as limited to a particular configuration. For example, the payload 116 may be coupled directly to (or positioned within) one or more of the aerial vehicles 102a, 102b, 102c. In certain aspects, the payload 116 may be omitted from one or more of the aerial vehicles 102a, 102b, 102c.

The AAVNS 100 is configured to operate plurality of aerial vehicles 102. For example, AAVNS 100 may be configured to operate plurality of aerial vehicles 102 in one or more predetermined formations 126 and to adjust dynamically a predetermined formation 126. AAVNS 100 may also be capable of generating, for each of the plurality of aerial vehicles 102, complete flight paths 104a, 104b, 104c from launch to landing (or touchdown), executing new flight paths 104a-104c as dictated by mission plan data, sensor data, or the like. In this way, AAVNS 100 detects and instructs the plurality of aerial vehicles 102 to avoid obstacles in flight, as well as in a descent-to-land phase of the flight, in a potentially GPS-denied environment. Such obstacles could be static (e.g., towers, trees, building, etc.) or dynamic, (e.g., no fly zones, other vehicles, birds, etc.). Moreover, AAVNS 100 may operate one or more of plurality of aerial vehicles 102 to autonomously identify and execute an aircraft landing at a landing zone 112 to complete a mission. For instance, AAVNS 100 may be further configured to perceive physical features of the ground to negotiate any conditions that could prevent a safe approach and/or landing of one or more of aerial vehicles 102a through 102c (e.g., unsafe/unstable ground composition, marshy/muddy ground, vegetation, and/or water) and may also be able to negotiate sloped landing sites.

In some examples, AAVNS 100 operates the plurality of aerial vehicles 102 based on sensor data generated by one or more sensors, which can be positioned on one or more of plurality of aerial vehicles 102 or even ground-based objects 130 (e.g., stationary or mobile units). For example, in some cases, each aerial vehicle 102a through 102c may include one or more sensors (e.g., sensors 108a, 108b, 108c) and one or more ground-based objects 130 may include sensors 108d. Such sensors 108a, 108b, 108c, 108d are configured to generate sensor data reflecting one or more characteristics of environment 118, such as, weather data, location data, obstacle data, mapping data, payload data, formation data, landing data, or the like. In turn, with reference to FIGS. 1b-1d, AAVNS 100 can use the sensor data to determine an alteration of a predetermined formation 126a (e.g., a first predetermined formation) to a different formation 126c (e.g., a second predetermined formation) of plurality of aerial vehicles 102, generate a flight path, execute a new flight path, detect obstacles, avoid obstacles, configure landing, or the like for one or more aerial vehicles 102a through 102c. In certain aspects, the different formation 126c is a second predetermined formation relative to the first aerial vehicle 102*a* that is different from the predetermined formation 126*a*. Example predetermined formations are discussed in greater detail below with reference to FIGS. 3*a*-3*f*. Within examples, the second predetermined formation (i.e., different formation 126*c*) is a straight-line formation, triangular formation, leader-subleader-follower formation, circular formation, disperse formation, or a complex formations that include one or more combinations of formations.

The one or more sensors 108*a*, 108*b*, 108*c*, 108*d* may either each employ the same type of sensor or employ a combination of different types sensors, in either case, the collective sensor data from the one or more sensors 108*a*, 108*b*, 108*c*, 108*d* can be used for dynamic (e.g., real-time or near real time) calculations (e.g., recalculating trajectories during operation). Therefore, it is not required to change the formation from one predetermined formation to another, but rather the AAVNS 100 can alter the predetermined formation dynamically as a function of the sensor data.

As noted above, the AAVNS 100 is configured to operate the plurality of aerial vehicles 102 in one or more predetermined formations 126 and to transition the plurality of aerial vehicles 102 between predetermined formations 126 (e.g., based on sensor data and/or commands from the first aerial vehicle 102*a*, the mission manager 114, etc.). By way of illustration, FIG. 1*b* illustrates a top plan view of the plurality of aerial vehicles 102 operating in an example predetermined formation 126*a* (e.g., the triangular arrangement of FIG. 1*a*). Based upon sensor data from the first aerial vehicle 102*a*, for example, the AAVNS 100 can transition the plurality of aerial vehicles 102 from the predetermined formation 126*a* to a different formation 126*c*, which will, for simplicity of illustration, be described as a linear formation. To that end, as illustrated in transition formation 126*b* of FIG. 1*c*, the AAVNS 100 instructs the third aerial vehicle 102*b* to transition laterally and rearwardly (as indicated by arrow A, e.g., by slowing down in terms of airspeed relative to the first aerial vehicle 102*a* and shift right) to assume at rearward-most position of the different formation 126*c*, and instructs the second aerial vehicle 102*b* to shift laterally (toward the left, as indicated by arrow B) to assume at middle position of the different formation 126*c*. FIG. 1*d* illustrates the plurality of aerial vehicles 102 operating in the different formation 126*c* upon completion of the transition. While triangular and linear formations are illustrated in this example, other formations are contemplated as will described in connection with FIGS. 3*a* through 3*f*.

In some examples, AAVNS 100 includes unmanned or optionally manned aerial vehicles 102*a* through 102*c*. In examples in which aerial vehicles 102*a* through 102*c* include unmanned vehicles, aerial vehicles 102*a* through 102*c* may be configured to operate in meteorological or operating conditions that may limit traditional manned cargo delivery, especially in austere terrains with low visibility due to dust, precipitation, or fog. In this way, the use of unmanned aerial vehicles 102*a* through 102*c* may allow completion missions too dangerous or difficult for the use of traditional manned vehicles.

Aerial vehicles 102*a* through 102*c* may include any type of unmanned or optionally manned aerial vehicles. As shown in FIGS. 1*a* through 1*d*, aerial vehicles 102*a* through 102*c* may be helicopters. As another example, aerial vehicles 102*a* through 102*c* may include multirotor aerial vehicle, such as a quadcopter, or aerial vehicles with forward flight capability, such as fixed-wing aircraft. In other examples, aerial vehicles 102*a* through 102*c* may include another suitable unmanned or optionally manned aerial vehicles. In still another example, one or more or plurality of aerial vehicles 102 may be manned. In some examples, aerial vehicles 102*a* through 102*c* may all be the same type of unmanned or optionally-manned aerial vehicle. In other examples, one or more of aerial vehicles 102*a* through 102*c* may be different from one or more other aerial vehicles of plurality of aerial vehicles 102.

While numerous aerial vehicle platforms are possible, suitable aerial vehicles 102*a* through 102*c* may be configured to operate at low density, high altitudes (greater than 12,000 feet density altitude). Aerial vehicles 102*a* through 102*c* may be further configured to carry small or large payload internally. Aerial vehicles 102*a* through 102*c* may travel at, for example, low or high speed. Within the terminal area, one or more aerial vehicles 102*a* through 102*c* may be configured to descend and land within a window/timeframe and to execute an autonomous landing as close to landing zone 112 as possible (e.g., an objective of less than 1 meter error from a computer-designated landing zone 112 center point) without over-flight of landing zone 112 (e.g., the vehicle executes a straight-in approach without a first pass). In addition, aerial vehicles 102*a* through 102*c* may be able to operate at night (thus facilitating operation 24 hours a day, 7 days a week) in possibly satellite-denied settings (e.g., preventing communication and/or satellite-based geo-location such as that provided by the Global-Positioning System ("GPS"), denoted "GPS-denied"), and in all types of environments, including steep and rugged terrain, instrument meteorological conditions (IMC) and non-icing conditions, high and hot environments, and in dust and sand conditions with minimum visibility. Aerial vehicles 102*a* through 102*c* may be configured to operate in weather conditions that exceed those of manned flight capabilities.

Figure 2A:
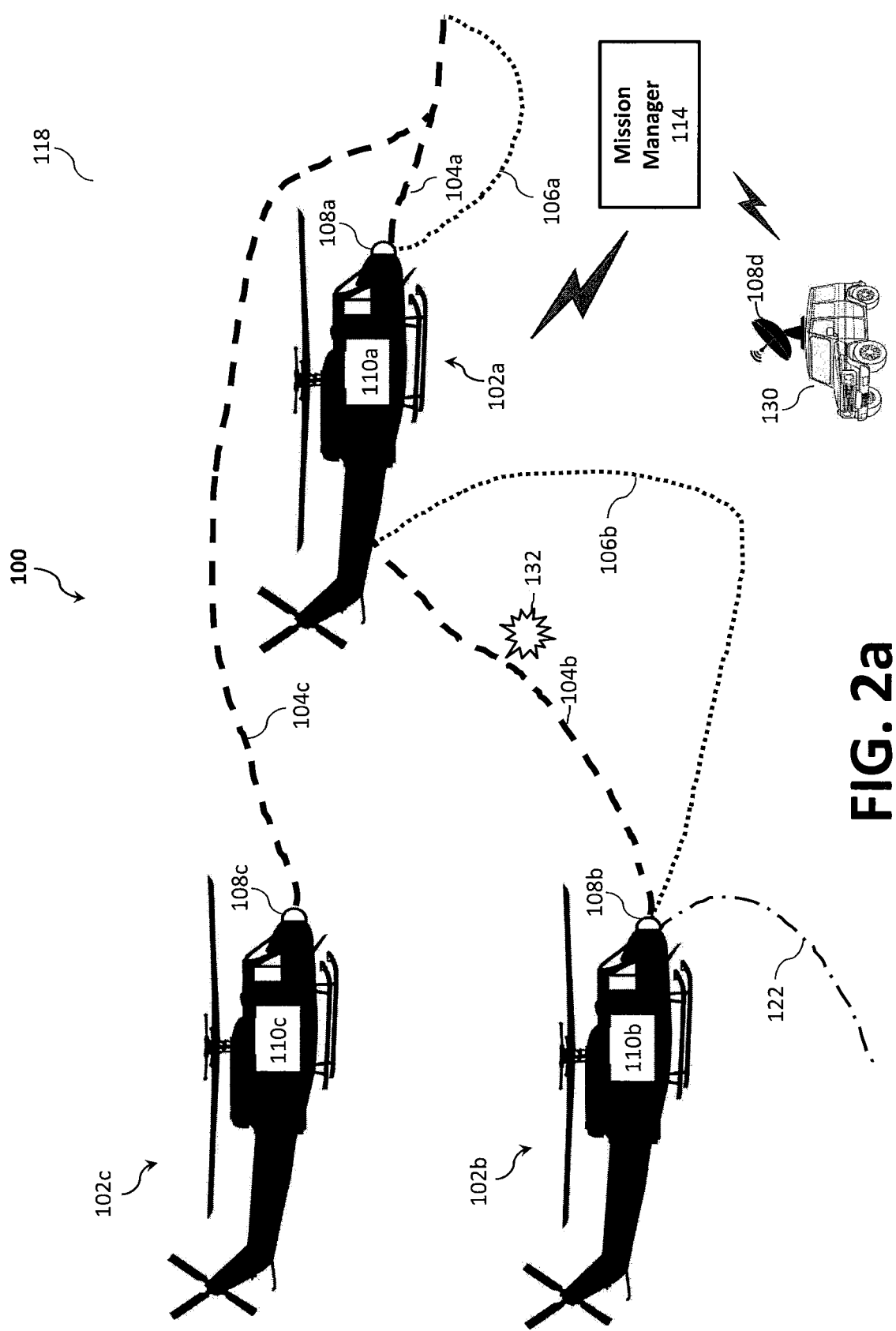
FIG. 2a is an enlarged view of the example autonomous aerial vehicle navigation system including the plurality of aerial vehicles in the environment.

FIG. 2*a* is an enlarged view of the example AAVNS 100 including plurality of aerial vehicles 102 in environment 118. In the example illustrated in FIG. 2*a*, AAVNS 100 is configured to operate each aerial vehicle 102*a* through 102*c* of plurality of aerial vehicles 102 to substantially follow a respective flight path 104*a*, 104*b*, 104*c*. For example, first aerial vehicle 102*a* may be operated to navigate along first flight path 104*a*, second aerial vehicle 102*b* may be operated to navigate along second flight path 104*b*, and third aerial vehicle 102*c* may be operated to navigate along third flight path 104*c*. In some examples, flight paths 104*a*, 104*b*, 104*c* may correspond to a predetermined formation of plurality of aerial vehicles 102.

In some examples, a first command module 110*a* of first aerial vehicle 102*a* receives a mission request or mission data, such as from a user device, a mission manager 114, or the like. First aerial vehicle 102*a* is configured to determine a first flight path 104*a* based on the mission request or mission data. For example, in some cases, first command module 110*a* may execute a flight path to land the plurality of aerial vehicles 102 at the landing zone 112 (as shown in FIG. 1*a*) in order for plurality of aerial vehicles 102 to complete the received mission. Such flight paths may include waypoints along the flight paths to meet the mission objective. Additionally, or alternatively, first command module 110*a* may determine a predetermined formation 126*a* of first aerial vehicle 102*a* relative to one or more aerial vehicles of plurality of aerial vehicles 102 based on the mission request of mission data. First command module 110*a* is configured to further determine a set of routes as part of first flight path 104*a* and/or the predetermined formation 126*a*. In other examples, first command module 110*a* may determine a first flight path 104*a* in an additional or alternative manner. Additionally, or alternatively, a different device, such as mission manager 114, may determine first flight path 104a or predetermined formation and send said first flight path 104a or predetermined formation to first command module 110a for execution.

The mission manager 114 can set a predetermined formation for first flight path 104a that then affects flights paths second flight path 104b and third flight path 104c. Thus, where first flight path 104a is a predetermined route, the second flight path 104b and third flight path 104c, under a formation flight, may be accomplished in one of multiple ways. In one example, the second flight path 104b and third flight path 104c can be preset based on first flight path 104a. In another example, the second flight path 104b and third flight path 104c can be determined based on the formation itself (e.g., maintaining absolute coordinates between the flight paths 104a, 104b, 104c).

After determining or receiving first flight path 104a, first command module 110a autonomously maneuvers first aerial vehicle 102a to follow, or substantially follow, first flight path 104a. In some examples, first command module 110a may update first fight path 104a (e.g., to avoid obstacles, save fuel, reduce flight time, etc.) or otherwise determine a first updated (or new) flight path 106a for first aerial vehicle 102a using sensor data reflecting one or more characteristics of environment 118 generated by a first sensor 108a (or another sensor in the AAVNS 100, including land-based sensors 108d). In such examples, first command module 110a may then maneuver first aerial vehicle 102a to navigate along the first updated flight path 106a. First command module 110a may autonomously maneuver first aerial vehicle 102a in any suitable manner. Moreover, in some examples, mission manager 114 or another component of AAVNS 100 are configured to autonomously maneuver first aerial vehicle 102a, such as by determining control signals based on sensed data and sending said control signals to first command module 110a.

In some examples, first command module 110a is configured to generate control signals as a function of the sensor data generated by first sensor 108a. For example, first command module 110a can generate control signals including one or more flight commands based at least in part on the sensor data or a flight path, which is based at least in part on the sensor data. That is, first command module 110a may generate control signals to control the operation of other aerial vehicles, such as second aerial vehicle 102b. Thus, in such examples, first command module 110a is configured to generate control signals that can be used by a second command module 110b of second aerial vehicle 102b to autonomously maneuver second aerial vehicle 102b. As another example, first command module 110a may determine a change from a predetermined formation 126a to a different formation 126c and may generate control signals reflecting the change. In some such examples, first command module 110a of first aerial vehicle 102a is configured to determine second flight path 104b for second aerial vehicle 102b based at least in part on the sensor data to reflect the change from the predetermined formation 126a to the different formation 126c. First command module 110a may then generate control signals reflecting the second flight path 104b.

First command module 110a is configured to send the generated control signals to send to second command module 110b of second aerial vehicle 102b. In other examples, first command module 110a is configured to send the control signals to mission manager 114 in addition to, or as an alternative to, sending the control signals to second command module 110b.

In some examples, second command module 110b of second aerial vehicle 102b receives the control signals from first command module 110a. In other examples, second command module 110b receives the control signals from mission manager 114 or another component of AAVNS 100. Second command module 110b is configured to autonomously maneuver second aerial vehicle 102b based on the received control signals. For example, second command module 110b may autonomously maneuver second aerial vehicle 102b from its position in the predetermined formation 126a to its position in the different formation 126c. Second command module 110b may autonomously maneuver second aerial vehicle 102b using any suitable method.

In some examples, the control signals may define a change from a predetermined formation 126a to a different formation 126c, which may be formations of one or more of plurality of aerial vehicles 102 as described above. For example, plurality of aerial vehicles 102 may be in a straight-line formation, a triangular formation, a circular formation, a diamond formation, a disperse formation, an arrow formation, or any other formation at any distance apart from each other to support the mission objective. In some examples, each aerial vehicle of plurality of aerial vehicles 102 may be at a position in the predetermined formation 126. In other examples, less than all of plurality of aerial vehicles 102 may in the predetermined formation 126. In yet another example, a plurality of aerial vehicles 102 may include a combination of different formation types to form a complex predetermined formation. For instance, some of plurality of aerial vehicles 102 may be in a straight-line formation while other aerial vehicles of plurality of aerial vehicles 102 may be in a disperse formation. Additional examples of predetermined formations of plurality of aerial vehicles 102 will be described with respect to FIGS. 3a through 3f. The predetermined formations can employ a hierarchical relationship among multiple levels of formations.

Additionally, or alternatively, the control signals may define a second flight path 104b (or flight commands corresponding to second flight path 104b) that substantially mimics the first flight path 104a, which was followed by first aerial vehicle 102a. In such examples, the second aerial vehicle 102b may follow in the same or substantially the same flight path as the first flight path 104a previously followed by the first aerial vehicle 102a. In another example, the control signals may define a second flight path 104b that targets and tracks the first aerial vehicle 102a itself, rather than merely following the first flight path 104a.

In other examples, the control signals may define second flight path 104b, or flight commands corresponding to second flight path 104b, that do not substantially mimic first flight path 104a. For example, first sensor 108a may generate sensor data that indicates the presence of an obstacle in the way of second flight path 104b when second aerial vehicle 102b is mimicking first flight path 104a. As one particular example, first sensor 108a may generate sensor data indicating an obstacle (e.g., obstacle 132) that could harm or prevent delivery of payload 116. In other words, second aerial vehicle 102b may be able to substantially follow first flight path 104a without consequence, but payload 116 may be affected by the presence of the obstacle detected by first sensor 108a. Thus, first command module 110a may generate control signals as a function of the sensor data that results in second aerial vehicle 102b following second flight path 104b without harm or other consequences to second aerial vehicle 102b or payload 116. In other examples, first command module 110a may generate control signals based on factors in addition to, or as alternative to, the effect of the generated sensor data on second aerial vehicle 102b and/or payload 116.

Figure 2B:
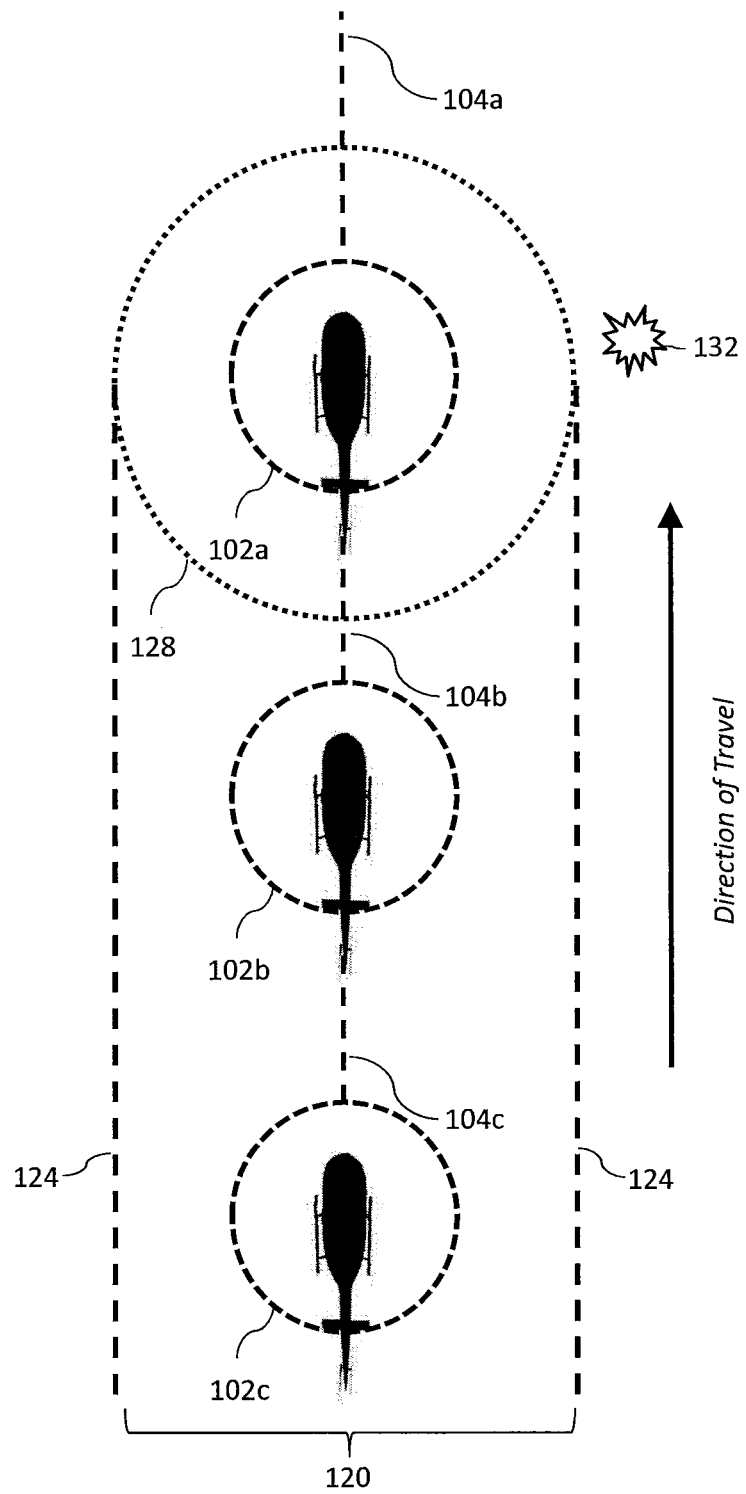
FIG. 2b is a top plan schematic diagram illustrating the plurality of aerial vehicles navigating as a function of zone data.

In some examples, the first command module 110a can generate and send zone data to the second command module 110b to navigate (or assist in navigating) the second aerial vehicle 102b. In one example, the zone data may indicate one or more zones 120 within an airspace that have been deemed safe (e.g., obstacle free) for flight or navigation by the second aerial vehicle 102b, for example. With reference to FIG. 2b, for example, the first command module 110a can generate zone data using first sensor 108a as the first aerial vehicle 102a navigates along its first flight path 104a. In operation, the mission manager 114 tracks and monitors any obstacles in its sensor field of view 128. The first command module 110a may generate and communicate to another aerial vehicle (e.g., the second aerial vehicle 102b) zone data. In this example, the second aerial vehicle 102b is illustrated as navigating along second flight path 104b that trails the first aerial vehicle 102a) zone data. If there are no materially relevant obstacles identified within the sensor field of view 128 (as illustrated in FIG. 2b), the zone data indicates that the zone 120 proximate the second flight path 104b is deemed safe (e.g., obstacle free) for flight or navigation by second aerial vehicle 102b. If one or more relevant obstacles are identified, the zone data may further indicate specifics of the obstacle(s) (e.g., location, size, shape, trajectory, speed, heading, etc.). As the first aerial vehicle 102a travels, the path boundaries 124 along the first flight path 104a define the zone 120 for other aerial vehicles (e.g., those trailing the first aerial vehicle 102a). In this example, the path boundaries 124 correspond to the size (e.g., width, diameter, etc.) of the sensor field of view 128, which is generally dictated by the available sensor data (e.g., the type, resolution, and penetration/depth of the first sensor 108a). As obstacles in an environment may be mobile, the zone data may include a time component (e.g., a validity period or expiration time). For example, the zone data may indicate that the zone 120 is deemed safe for only a predetermine amount of time after a triggering event (e.g., sensor reading, transmission of sensor data, etc.). That is, once the sensor payload 108a has navigated out of range of the zone 120, the determination whether or not obstacles exist in the zone 120 is deemed outdated after a predetermined period of time has elapsed from the triggering event. While described in connection with the second aerial vehicle 102b, the zone data can also be communicated to the third aerial vehicle 102c, which is illustrated as navigating along third flight path 104c that trails the second aerial vehicle 102b. The zone data can be communicated directly to the third aerial vehicle 102c from the first aerial vehicle 102a, or via the second aerial vehicle 102b (e.g., as a relay).

Second command module 110b may then be able to autonomously maneuver second aerial vehicle 102b to enter or operate within zones 120 based at least in part one the received zone data. In this way, second command module 110b may have more flexibility in autonomously maneuvering second aerial vehicle 102b rather than strictly relying on flight commands and/or flight paths received from first command module 110a or mission manager 114. Moreover, in some examples, the zone data may indicate zones 120 in which second aerial vehicle 102b can navigate to form a predetermined formation. In other examples, second command module 110b may not receive zone data and may autonomously maneuver second aerial vehicle 102b based on the control signals received from first command module 110a or mission manager 114.

In some examples, second command module 110b of second aerial vehicle 102b receives its original flight path (e.g., second flight path 104b) from one of first aerial vehicle 102a and/or mission manager 114. At a later time, second command module 110b may receive control signals, sensor data (from first command module 110a, mission manager 114, or second sensors 108b), flight commands, or the like and determine, based on the control signals, sensor data, or flight commands, a modified flight path (e.g., second updated flight path 106b). Second command module 110b is configured to compare the original flight path to the modified flight path and determine any differences between the original flight path and modified flight path. In some such examples, if second command module 110b determines (e.g., detects or identifies) any differences, second command module 110b may autonomously maneuver second aerial vehicle 102b to follow the modified flight path.

In other examples, first command module 110a or mission manager 114 is configured to compare and modify flight paths. In such examples, first command module 110a or mission manager 114 may send the modified flight paths (e.g., as control signals) to second command module 110b to enable autonomous control of second aerial vehicle 102b based on the modified flight paths. For example, first command module 110a is configured to send a control signal including a flight command to second command module 110b to divert second aerial vehicle 102b from an original flight path (e.g., second flight path 104b) to follow a modified flight path (e.g., second updated flight path 106b to avoid an obstacle 132). Second command module 110b may receive the control signal with the flight command instructing second aerial vehicle 102b to follow modified flight path and may autonomously maneuver second aerial vehicle 102b to move substantially along the modified flight path. In some examples, second command module 110b may receive control signals including a second flight command from first command module 110a to return second aerial vehicle 102b from modified flight path back to the original flight path (e.g., once clear of the obstacle 132). Second command module 110b may then autonomously maneuver second aerial vehicle 102b to navigate along second flight path 104b.

In yet another example, second aerial vehicle 102b may include one or more sensors 108b configured to track the location and/or position of first aerial vehicle 102a. In some such examples, in addition to, or as an alternative to, second command module 110b receiving control signals from first command module 110a in order for second command module 110b to autonomously maneuver second aerial vehicle 102b, second set of sensors 108b is configured to generate sensor data reflecting the location of, position of, distance to, or the like of first aerial vehicle 102a. Second command module 110b may then be configured to generate control signals, flight commands, and/or flight paths as a function of the sensor data such that second aerial vehicle 102b is autonomously maneuvered to follow first aerial vehicle 102a. Therefore, in some such examples, second sensors 108b may be less advanced than first set of sensors 108a, as second sensors 108b may only track the position of first aerial vehicle 102a without generating sensor data reflecting characteristics of environment 118. As discussed above, such reduced functionality of second sensors 108b, second command module 110b, or other components of second aerial vehicle 102b may reduce the cost of manufacturing, operating, or maintaining AAVNS 100. In other examples, however, second sensors 108b is configured to generate sensor data reflective of both the position of first aerial vehicle 102*a* and characteristics of environment 118. In certain aspects, one command module may maneuver the another aerial vehicle to autonomously follow the aerial vehicle based on the control signals and a tracked position of the aerial vehicle.

As another example, rather than configuring the second aerial vehicle 102*b* to track the position of first aerial vehicle 102*a*, in some cases first aerial vehicle 102*a* is configured to track the position of second aerial vehicle 102*b*. First command module 110*a* of first aerial vehicle 102*a* may then generate control signals including flight commands, a flight path, or a predetermined formation to send to second command module 110*b* such that second command module 110*b* can autonomously maneuver second aerial vehicle 102*b* based on the received control signals. In this way, second aerial vehicle 102*b* may include fewer, varied (e.g., sensors with different functionalities, sensing capabilities, computing capabilities, or the like), or even no sensors 108*b* and may receive control signals from first aerial vehicle 102*a* without second command module 110*b* having to analyze sensor data and generate control signals on its own. In certain aspects, various sensors may be distributed among the multi-vehicle formation to collectively provide a more robust (e.g., more validated) situational awareness to one or more aerial vehicles in the formation.

Further, in some examples, second command module 110*b* may receive an alert signal, such as from first command module 110*a* or mission manager 114. Upon receipt of the alert signal, second command module 110*b* may initiate a dispersion pattern flight path 122, which is illustrate as being different than second flight path 104*b*. Therefore, upon receipt of the alert signal, second command module 110*b* can autonomously maneuver second aerial vehicle 102*b* to follow dispersion pattern flight path 122 and avoid a detected obstacle, danger, hazard, or the like that may have prompted first command module 110*a* or mission manager 114 to send the alert signal. In some examples, first command module 110*a* or mission manager 114 is configured to send a termination alert to second command module 110*b* upon determining that the event prompting the alert signal is no longer present or active. Second command module 110*b*, upon receiving the termination alert, may instruct or maneuver second aerial vehicle 102*b* to return to navigating along second flight path 104*b*.

In some examples, first aerial vehicle 102*a* and/or second aerial vehicle 102*b* is configured to generate and send control signals to third command module 110*c* of third aerial vehicle 102*c* for third command module 110*c* to autonomously maneuver third aerial vehicle 102*c* based on the control signals. In some such examples, first command module 110*a* of first aerial vehicle 102*a* may generate control signals including a change from one predetermined formation to another, flight commands, or third flight path 104*c* in the same or a similar manner to that as described above with respect to second aerial vehicle 102*b*. For example, first command module 110*a* may determine a second change from the predetermined formation 126*a* to the different formation 126*c* for third aerial vehicle 102*c* based on the sensor data. First command module 110*a* may then generate the control signals to reflect the second change from its position in the predetermined formation 126*a* to its position in the different formation 126*c*. In such examples, third command module 110*c* of third aerial vehicle 102*c* may autonomously maneuver third aerial vehicle 102*c* based on the control signals. As another example, in some cases, first command module 110*a* of first aerial vehicle 102*a* is configured to send control signals to both second aerial vehicle 102*b* and third aerial vehicle 102*c* such that second and third aerial vehicles 102*b*, 102*c* maintain a predetermined aerial formation relative to first aerial vehicle 102*a*. Additionally, or alternatively, second command module 110*b* of second aerial vehicle 102*b* is configured to generate control signals including flight commands or third flight path 104*c* and send such control signals to third command module 110*c*. In yet another example, third aerial vehicle 102*c* is configured to track and follow at least one of first aerial vehicle 102*a* or second aerial vehicle 102*b*.

Moreover, as discussed above, plurality of aerial vehicles 102 may include more than three aerial vehicles in some examples. In examples in which plurality of aerial vehicles 102 includes more than three aerial vehicles, the additional aerial vehicles is configured to receive control signals from another aerial vehicle of plurality of aerial vehicles 102 or from mission manager 114 in accordance with the present disclosure. Therefore, AAVNS 100 enables one or more aerial vehicles of plurality of aerial vehicles 102 to have simpler capability than one or more other aerial vehicles of plurality of aerial vehicles 102 while maintaining safe, efficient, accurate, and effective operation and mission completion. AAVNS 100 may also be a safe, efficient, accurate, and effective manner of operating plurality of aerial vehicles 102 in one or more predetermined formations.

One or more of plurality of aerial vehicles 102 includes sensors (e.g., sensors 108*a*, 108*b*, 108*c*) configured to generate sensor data including weather data, location data, obstacle data, mapping data, payload data, formation data, landing data, or the like. Weather data may include information such as air data, storm data, temperature data, visibility data, or any other weather data. Location data may include information such as the location of one or more aerial vehicles of plurality of aerial vehicles 102, an operating base, a fuel zone, a combat outpost, or any other location data. Obstacle data may include information such as the location of static obstacles (e.g., towers, trees, building, etc.) or dynamic obstacles (e.g., no fly zones due to enemy activity, other vehicles, etc.), identification of the obstacle, hazard detection information, or any other obstacle data. Mapping data may include information to place detected obstacles or hazards, weather systems, landing zones, or the like relative to each other. Payload may include information pertaining to payload 116 optionally carried by one or more aerial vehicles 102*a* through 102*c*, such as, for example, the weight of payload 116, the status of payload 116, the location of payload 116, or the like. Formation data may include data regarding a formation of plurality of aerial vehicles 102. For examples, sensors may be able to determine the formation of aerial vehicles 102*a* through 102*c* relative to one other (e.g., in a straight-line formation, in a triangular formation, etc.). Landing data may include data about the landing zone, such as, for example, the terrain of the landing zone, gesture detection information, the grade of the landing zone, or any other landing data. Although sensor data is described herein to include weather data, location data, obstacle data, mapping data, payload data, formation data, and/or landing data, sensor data may include any additional or alternative sensor data applicable to AAVNS 100. AAVNS 100 may in turn use said generated sensor data to generate control signals for one or more of plurality of aerial vehicles 102.

Sensors may include any suitable sensors, such as one or more of light detection and ranging (LIDAR), Radio Detection and Ranging (RADAR), electro optical infrared (EO/IR) Imagers, a stereo vision camera system, radio altimeter (RADALT), air data sensor, GPS/inertial navigation system (INS), or any other suitable sensor. In other examples, one or more of aerial vehicles 102a through 102c may include a single sensor 108. In some examples, one or more of aerial vehicles 102a through 102c may include two or more sensors 108, which may be the same or different. For example, the one or more of sensors may include optical sensors and non-optical sensor (e.g., RADAR, acoustic sensors, RADALT, air data sensor, microelectromechanical systems (MEMS), etc.). In still another example, one or more of plurality of aerial vehicles 102 may not include any sensors 108. For instance, in some cases, first aerial vehicle 102a may include one or more sensors 108a and second and/or third aerial vehicles 102b, 102c may not include sensors 108b, 108c. In a similar manner, in some examples, first aerial vehicle 102a may include one or more sensors 108a that are more sophisticated (e.g., more accurate, enhanced detection capabilities, more granular sensing, etc.) than sensors 108b, 108c of second and/or third aerial vehicles 102b, 102c.

One or more of sensors may be pointed to certain directions with regard to the flight direction, for example forward facing, rear-facing, downward-facing, or omni-directional. For instance, in some examples, one or more sensors 108a of first aerial vehicle 102a may include a forward-facing optical sensor and a rear-facing optical sensor. In some such examples, at least one of the forward-facing optical sensor or the rear-facing optical sensor may include a LIDAR sensor. In other examples, one or both of the forward-facing or rear-facing sensor may include a sensor other than a LIDAR or optical sensor.

As illustrated in FIG. 2a, in some examples, each aerial vehicle 102a through 102c may include one or more sensors 108a, 108b, 108c configured to generate sensor data. In some such examples, one of first aerial vehicle 102a, second aerial vehicle 102b, or third aerial vehicle 102c may have fewer or different (e.g., different functionalities, sensing capabilities, computing capabilities, etc.) sensors than another of first aerial vehicle 102a, second aerial vehicle 102b, or third aerial vehicle 102c. For example, in cases in which first command module 110a generates control signals to send to second command module 110b for second command module 110b to autonomously maneuver the operation of second aerial vehicle 102b, second aerial vehicle 102b may include second sensors 108b that are different than first sensors 108a of first aerial vehicle 102a. Additionally, or alternatively, second sensors 108b may include a fewer number of sensors than first sensors 108a. In this way, first sensors 108a of first aerial vehicle 102a may be configured to generate enhanced sensor data (e.g., more sensor data, more granular sensor data, more accurate sensor data, etc.) than second sensors 108b of second aerial vehicle 102b. Moreover, in some examples, second aerial vehicle 102b may not include any sensors configured to generate sensor data that reflects one or more characteristics of environment 118, and second aerial vehicle 102b may instead obtain relevant flight information (e.g., in the form of control signals) from first command module 110a or mission manager 114. In other examples, first sensors 108a on board first aerial vehicle 102a may face in a different direction or include different types of sensors than one or more other aerial vehicles of plurality of aerial vehicles 102. The AAVNS 100 may fuse the sensor data from the various aerial and ground-based sensors (e.g., one or more sensors 108a, 108b, 108c, 108d) to provide increased perception of the environment 118 via, for example, the mission manager 114 and/or one or more of the first, second, or third command modules 110a, 110b, 110c.

When sensor data is received from the first aerial vehicle 102a (or another source), the second aerial vehicle 102b may employ different, less sophisticated, or fewer sensors configured to generate sensor data reflecting one or more characteristics of environment 118. In certain aspects, the second aerial vehicle 102b may entirely omit such sensors and rely solely on sensor date from the first aerial vehicle 102a (or another source). Therefore, the second aerial vehicle 102b may be less expensive to manufacture, operate, or maintain compared to, for example, the first aerial vehicle 102a, while still enabling second aerial vehicle 102b to obtain relevant characteristics of environment 118 (from first command module 110a of first aerial vehicle 102a or mission manager 114). Thus, AAVNS 100 including second aerial vehicle 102b being less expensive than first aerial vehicle 102a may enable AAVNS 100 to be less expensive overall than some other autonomous vehicle control systems, while enabling AAVNS 100 to efficiently and safely complete missions. As a further example, third aerial vehicle 102c may have different sensors than those of either or both of first aerial vehicle 102a or second aerial vehicle 102b and receive control signals generated as a function of sensor data from one or both of first command module 110a, second command module 110b, or mission manager 114.

Although described with respect to first aerial vehicle 102a having higher sensing capability than second aerial vehicle 102b, in other examples, any aerial vehicle 102a through 102c of plurality of aerial vehicles 102 may have less sensing coverage than any other aerial vehicle 102a through 102c of plurality of aerial vehicles 102. As a specific example, plurality of aerial vehicles 102 may include ten aerial vehicles. In such an example, a first aerial vehicle, such as first aerial vehicle 102a, may be the most sophisticated aerial vehicle, or leader of plurality of aerial vehicles 102. That plurality of aerial vehicles 102 may further include three aerial vehicles, or subleaders, that are different from those of the first aerial vehicle, or leader, but are more sophisticated than the remaining six aerial vehicles in the pack. Thus, the leader of plurality of aerial vehicles 102 may have the most effective and/or advanced sensors, the subleaders of the plurality of aerial vehicles may have relatively advanced sensors (while also relying at least in part on sensor data received from the leader), and the remaining aerial vehicles may have little or no sensor capabilities and rely almost entirely on information received from or generated by the leader and/or subleaders of the plurality of aerial vehicles 102. In other words, so long as at least one aerial vehicle 102a through 102c of plurality of aerial vehicles 102 has sensors sophisticated or sufficiently advanced to enable autonomous control of plurality of aerial vehicles 102 and each aerial vehicle 102a through 102c is capable of communicating with at least one other aerial vehicle 102a through 102c or mission manager 114, then sensor data generated by the at least one aerial vehicle 102a through 102c can be used to generate or modify control signals, predetermined formations, flight commands, and/or flight paths for plurality of aerial vehicles 102.

As noted above the plurality of aerial vehicles 102 can assume a predetermined formation 126a. FIGS. 3a through 3f are schematic diagrams illustrating example predetermined formations 300a-300f of a plurality of aerial vehicles 302a-302f. The example formations 300a-300f are for exemplary purposes only. In other examples, other formations, number of aerial vehicles in each plurality of aerial vehicles 302a-302f, configurations of plurality of aerial vehicles 302a-302f within the formations, or the like may be used in accordance with the aspects of the disclosure. Moreover, although plurality of aerial vehicles 302a-302f of the example formations 300a-300f will be described as having a general direction of travel in the direction of the arrows illustrated in FIGS. 3a through 3f, in other examples, the formations 300a-300f may travel in one or more additional or alternative directions.

In the following examples, plurality of aerial vehicles 302a-302f are described with respect to up to three different types of aerial vehicles within each plurality of aerial vehicles 302a-302f. For example, in some cases, one or more aerial vehicles of plurality of aerial vehicles 302a-302f may be leader aerial vehicles 304, one or more aerial vehicles of plurality of aerial vehicles 302a-302f may be subleader aerial vehicles 306, and one or more aerial vehicles of plurality of aerial vehicles 302a-302f may be follower aerial vehicles 308. In other words, the plurality of aerial vehicles 302a-302f may be arranged with a hierarchy of command. In some such examples, each of leader aerial vehicles 304, subleader aerial vehicles 306, and follower aerial vehicles 308 may have different functionalities, sensing capabilities, computing capabilities, or other differences. For instance, in some examples, leader aerial vehicles 304 may have the most sophisticated sensing and/or computing capabilities of plurality of aerial vehicles 302a-302f, follower aerial vehicles 308 may have the least sophisticated or even no sensing and/or computing capabilities, and subleader aerial vehicles 306 may have sensing and/or computing capabilities in between those of leader aerial vehicles 304 and follower aerial vehicles 308. For example, as discussed above, leader aerial vehicles 304, subleader aerial vehicles 306, and/or follower aerial vehicles 308 may be in communication with each other such that sensor data, mission data, formation information, flight paths, flight commands, control signals, and the like can be communicated between plurality of aerial vehicles 302a-302f in accordance with AAVNS 100 as described herein. In other examples, however, plurality of aerial vehicles 302a-302f may all have the same or similar sensing and/or computing capabilities and may be differentiated in another characteristic, or plurality of aerial vehicles 302a-302f may all be substantially the same.

Moreover, in some examples, plurality of aerial vehicles 302a-302f may have one or more of each of leader aerial vehicle 304, subleader aerial vehicle 306, and follower aerial vehicle 308. In other examples, plurality of aerial vehicles 302a-302f may not have one or more of leader aerial vehicles 304, subleader aerial vehicles 306, or follower aerial vehicles 308. Thus, although FIGS. 3a through 3f have various aerial vehicles labeled as leader aerial vehicles 304, subleader aerial vehicles 306, and follower aerial vehicles 308, any of plurality of aerial vehicles 302a-302f can be any one of leader aerial vehicles 304, subleader aerial vehicles 306, follower aerial vehicles 308, or any other aerial vehicles as described herein.

FIG. 3a illustrates an example straight-line formation 300a of plurality of aerial vehicles 302a. FIG. 3b illustrates an example triangular formation 300b of plurality of aerial vehicles 302b. FIG. 3c illustrates an example leader-subleader-follower formation 300c of plurality of aerial vehicles 302c. In the example of FIG. 3c, there is one leader aerial vehicle 304c, three subleader aerial vehicles 306c, and six follower aerial vehicles 308c. Leader aerial vehicle 304c may communicate control signals, flight commands, flight paths, alerts, or the like to subleader aerial vehicles 306c, which in turn may communicate control signals, flight commands, flight paths, alerts, or the like to follower aerial vehicles 308c. FIG. 3d illustrates an example circular formation 300d of plurality of aerial vehicles 302d. In the example of FIG. 3d, both the front end (e.g., in the direction of travel indicate by the arrow) and the rear end of the circular formation 300d have a leader aerial vehicle 304d. FIG. 3e illustrates an example disperse formation 300e of plurality of aerial vehicles 302e, which can be used when avoiding obstacle. In certain aspects, the multiple different predetermined disperse formations 300e may be available, of which one can be selected depending on obstacle parameters, such as the obstacle's size, orientation, attitude, direction of travel, etc. The disperse formation 300e can be adjusted or otherwise modified upon detection of the object's characteristics, which may be based at least in part on sensor data from a lead aerial vehicle. For example, the disperse pattern of a three-pack may be a triangular formation (while its operating in a straight line formation), lead detects an object identifies its path than causes the formation to changes to the predetermined triangle formation while adjusting the configuration of the predetermined triangle formation—e.g., distance, orientation, etc.

In some examples, a disperse formation 300e may appear to be random, while in reality plurality of aerial vehicles 302e may be arranged in the disperse formation 300e in a certain manner (e.g., maintaining certain positions, distances, etc. from one or more aerial vehicles of plurality of aerial vehicles 302e) and only appear to be in an unorganized configuration. FIG. 3f illustrates an example complex formation 300f of plurality of aerial vehicles 302f. In some examples, plurality of aerial vehicles 302f may be arranged in complex formations 300f that may include one or more combinations of formations. For example, in the example of FIG. 3f, plurality of aerial vehicles 302f is configured in two different formations, a straight-line formation and a disperse formation. In addition to the examples of FIGS. 3a through 3f, plurality of aerial vehicles 302a-f may be arranged in any suitable formation.

In this way, in examples in which first command module 110a determines a change from a predetermined formation 126a to a different formation 126c for second aerial vehicle 102b based at least in part on the sensor data, first command module 110a may determine a change from any predetermined formation 300a-f of FIGS. 3a through 3f, or another predetermined formation, to any other predetermined formation 300a-f of FIGS. 3a through 3f, or any other predetermined formation. First command module 110a may then generate control signals reflecting that change and send the control signals to second aerial vehicle 102b. A similar process may be used for other aerial vehicles of plurality of aerial vehicles 102.

Figure 4A:
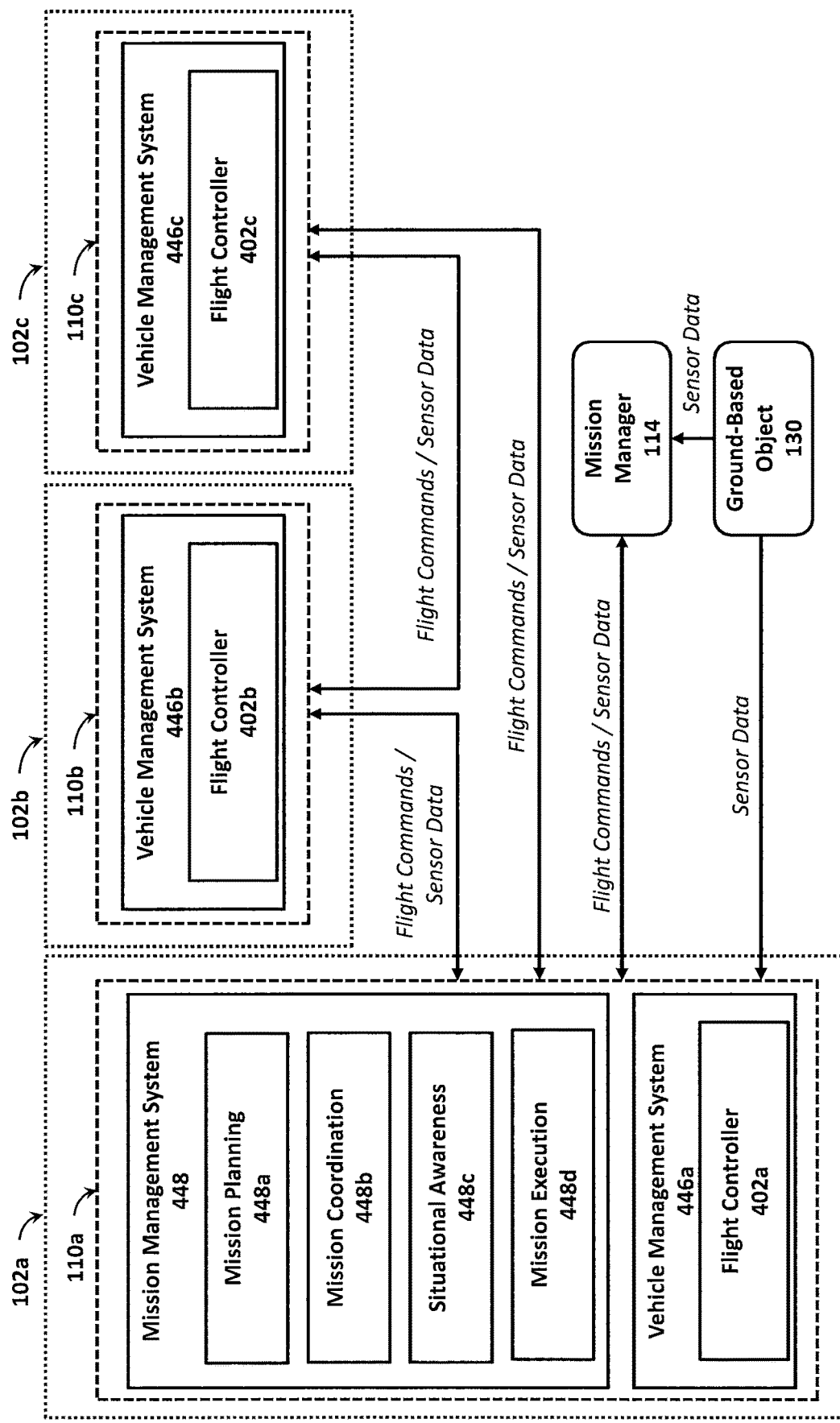
FIG. 4a is a block diagram illustrating software functional architecture to facilitate operation between and among a mission manager and a plurality of aerial vehicles.

FIG. 4a illustrates an example software functional architecture to facilitate operation between a mission manager 114, one or more ground-based objects 130 (if available), and a plurality of aerial vehicles 102a, 102b, 102c where a single leader aerial vehicle (e.g., first aerial vehicle 102a) is equipped to make decisions for other aerial vehicles (e.g., second and third aerial vehicles 102b, 102c). The plurality of aerial vehicles 102a, 102b, 102c are configured to communicate data (e.g., flight commands and/or sensor data) between the mission manager 114 and/or one or more aerial vehicles 102a, 102b, 102c. The mission manager 114 and/or one or more aerial vehicles 102a, 102b, 102c may also communicate sensor data from one or more ground-based objects 130. The data may be communicated in one of multiple ways. For example, directly between the mission manager 114 and an aerial vehicle (e.g., first aerial vehicle 102a), directly between two or more aerial vehicles (e.g., between first aerial vehicle 102a and second aerial vehicle 102b), or indirectly between two or more aerial vehicles (e.g., between first aerial vehicle 102a and third aerial vehicle 102c via second aerial vehicle 102b as a relay), etc. As illustrated, each of the plurality of aerial vehicles 102a, 102b, 102c includes a command module 110a, 110b, 110c with a vehicle management system 446a, 446b, 446c and a flight controller 402a, 402b, 402c to control various components of its corresponding aerial vehicle 102a, 102b, 102c (e.g., control surfaces or other flight components 416a).

In the illustrated example, the first aerial vehicle 102a operates as the leader and employs a mission management system 448 to process information (e.g., sensor data from the first sensor 108a or mission manager 114) to provide various functions, include mission planning 448a, mission coordination 448b, situation awareness 448c, and mission execution 448d. As illustrated, each of the plurality of aerial vehicles 102a, 102b, 102c is equipped with a flight controller 402a, 402b, 402c, but not all aerial vehicles 102a, 102b, 102c need to be equipped with a mission management system 448 to handle mission planning 448a, mission coordination 448b, situation awareness 448c, and mission execution 448d. In operation, the mission manager 114 and/or the first command module 110a can generate trajectory/path information for the first aerial vehicle 102a and each of the remaining aerial vehicle 102b, 102c, which each control its respective flight controller 402b, 402c accordingly to execute the path (e.g., second and third flight paths 104b, 104c) dictated by the mission manager 114 and/or the first command module 110a. In other words, the first command module 110a has the ability to detect and determine changes in path (e.g., based on sensor data), whereas the second command module 110b and third command module 110c are configured to navigate the respective second and third aerial vehicles 102b, 102c based on information received from the first command module 110a, rather than on-board sensors (if any).

Figure 4B:
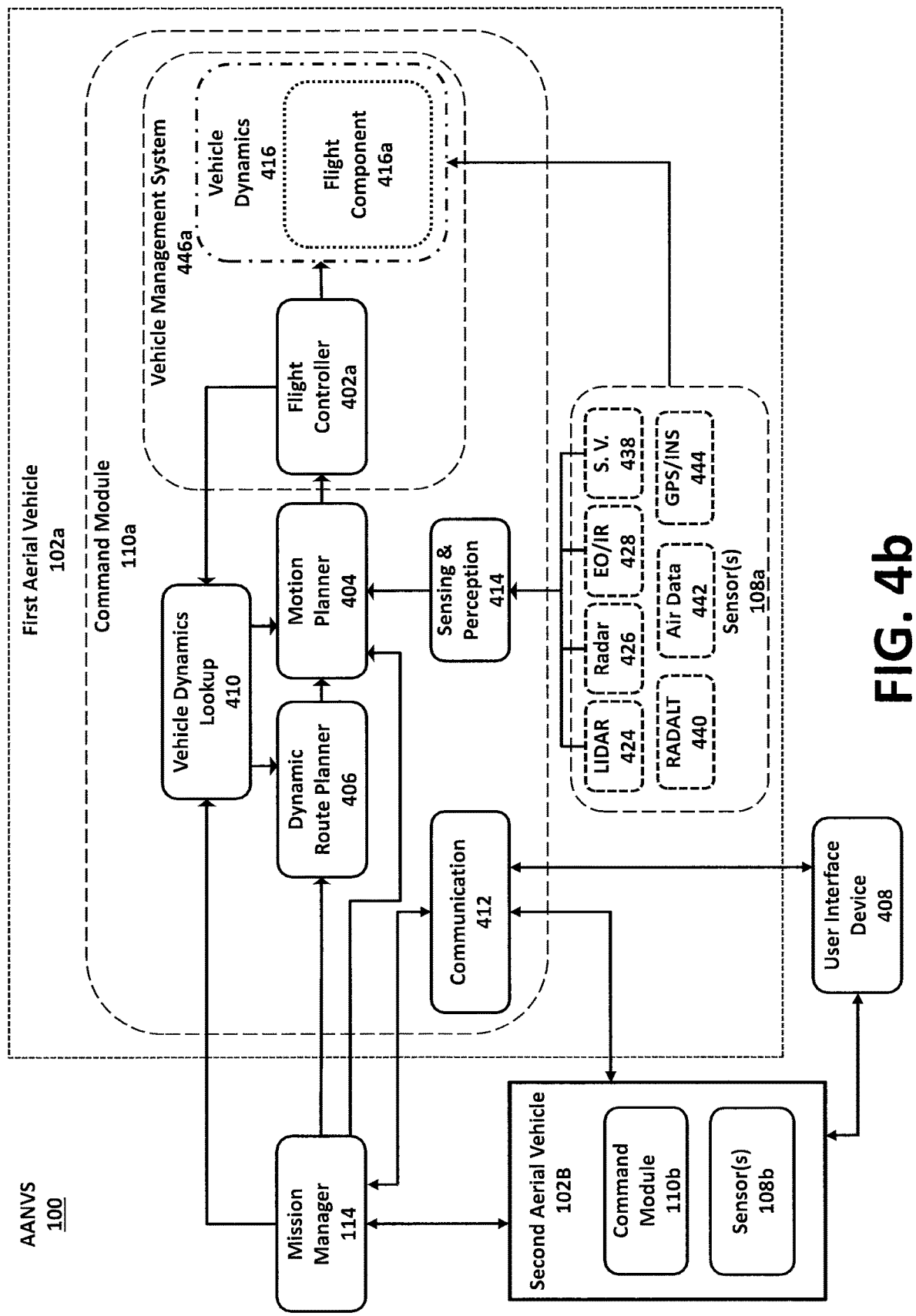
FIG. 4b is a block diagram illustrating an example autonomous aerial vehicle navigation system.

FIG. 4b illustrates a block diagram of an example AAVNS 100. As illustrated in FIG. 4b, first command module 110a of AAVNS 100 may comprise a flight controller 402a, a motion planner 404, a dynamic route planner 406, a sensing and perception module 414, and a vehicle dynamics lookup 410. To facilitate the various functionalities of AAVNS 100, AAVNS 100 may employ one or more command modules (e.g., first command module 110a), each command module may comprise one or more processors operably couple to (1) a memory device, (2) one or more of sensors 108, and/or (3) other systems disclosed herein or those known in the art. For example, to process and manipulate data, first command module 110a may be equipped to run software that may be stored to ROM, RAM, or one or more other computer-readable storage mediums. Similarly, data collected or created by AAVNS 100 may be stored to RAM, ROM, or another suitable storage medium for longer-term retention. AAVNS 100 may receive and transmit, via said first command module 110a, data related to its location, speed, one or more of plurality of aerial vehicles 102, or any other data. First command module 110a and/or other hardware may be powered by a power supply, which may be alternating or direct current (e.g., traditional line current, battery power, solar power, wind power, etc.). Although described with respect to first command module 110a, any other processor (e.g., second command module 110b, third command module 110c, or another suitable processor), or combinations thereof may be configured to provide the functionalities attributed to AAVNS 100, mission manager 114, or any other elements as described herein.

Flight controller 402a may provide feedback (e.g., vehicle state data, wind estimation data, etc.) to vehicle dynamics lookup 410 via vehicle dynamics 416, which may generate vehicle dynamic data from one or more sensors 108. Such vehicle dynamic data may also be used as inputs to one or more flight controllers or flight controller systems to control components of the aircraft (e.g., flight components 416a). In some cases, a flight controller 402a may be operatively coupled with motion planner 404, a vehicle dynamics lookup 410, and a vehicle dynamics 416. In operation, the flight controller 402a generates control signals based at least in part on data received from, for example, motion planner 404, and one or more sensors 108. The control signals generated by flight controller 402a may be communicated to, or used to control, flight components 416a. Example flight components 416a include, for example, rotorcraft flight controls (e.g., a collective, cyclic, pedals, throttle, auxiliary components, etc.), fixed-wing aerial vehicle controls (e.g., ailerons, rudder, trim tabs, elevators, throttle, etc.), or any other suitable flight components or controls. Thus, the first command module 110a, together with other hardware on-board first aerial vehicle 102a (e.g., flight controller 402a, sensors 108a, etc.), can function as the mission management system 448 for each aerial vehicle in a given formation (e.g., first, second, and third aerial vehicles 102a, 102b, 102c).

In some examples, flight controller 402a may further employ, for example, a user interface, and a processor operatively coupled to a memory/data storage and one or more of sensors 108. For example, to process and manipulate data, a processor may be equipped to run software, which may be stored to ROM, RAM, or one or more other computer-readable storage mediums. Similarly, data collected or created by flight controller 402a may be stored to RAM, ROM, or another suitable storage medium for longer-term retention. Flight controller 402a may receive and transmit, via said processor, data related to location, speed, attitude, etc. Flight controller 402a may further comprise a remotely situated user interface allowing an operator (e.g., either human- or computer-implemented, either of which may be local or remote) to input commands, display information, and/or control operation of flight controller 402a. The remotely situated user interface may be the same remotely situated user interface used to control AAVNS 100. The user interface may be coupled with flight controller 402a, and may include, for example, a computer, a keyboard, mouse, touch screen, joystick, and the like. To monitor the various flight conditions, flight controller 402a may further employ one or more sensors (e.g., weather RADAR, engine sensors, vertical/directional gyroscopes, accelerometer, thermometer, altimeters, etc.).

Motion planner 404 plans trajectories and receives data (e.g., sensor data, obstacle data, and state data) from sensing and perception module 414, which may receive sensor data from various sensors positioned on one or more aerial vehicles of plurality of aerial vehicles 102. The various sensors may include, for example, LIDAR 424, Radio Detection and Ranging (RADAR) 426, electro optical infrared (EO/IR) Imagers 428, a stereo vision camera system 438, radio altimeter (RADALT) 440, air data sensor 442, and/or GPS/inertial navigation system (INS) 444.

In some examples, given an original flight path from a mission planner, motion planner 404 computes trajectories based on multiple objectives including proximity to obstacles, desired landing vector (based on wind direction), vehicle dynamics, and localization accuracy. The trajectory generation scheme also continuously improves and optimizes trajectories based on the criteria specified. It quickly produces and iterates on a new commanded path that avoids any detected obstacles and that the vehicle can follow. An advantage of this approach may be that the fidelity of the parallel planning algorithm scales with available computing power. If resources are limited, only a small part of the search space can be explored while still obtaining an acceptable (e.g., "good-enough") solution. The planning system is robust and adaptive to the changing dynamics of one or more of plurality of aerial vehicles 102 because they will change depending on the weight and wind conditions. Special maneuvers relevant to launch from and landing on sloped terrain may also be employed. The algorithm may be configured to account for unexpected discontinuities in vehicle dynamics, e.g., contact with undetected ground features, through the addition of hidden states. Such mission-level and motion planning algorithms may be adapted to a wide range of aerial vehicles. They combine multiple objectives and constraints in real time, incorporate and adapt the dynamics into the motion plan with higher fidelity control, and propagate uncertainties for robust control in sloped landing.

AAVNS 100 may further include dynamic route planner 406. In some such examples, route planning may be facilitated via a software algorithm called "4D–D*" that explicitly addresses the problem of routing multiple vehicles using a combination of data from maps as well as incrementally discovered information from sensors 108. 4D–D provides an advantage that completely new trajectories can be calculated in milliseconds over a large map by modifying the old trajectories versus having to completely re-compute upon receiving new information. Depending on mission urgency or the priority given to saving fuel, different paths might be preferred. The algorithm will choose paths that optimize a large set of criteria, some of which might change during the mission. The algorithm complexity (compute time) may implement an "any time" version that will continually improve the solution given time but will produce an answer (in some cases, suboptimal) at any time it may be requested.

In use, data may be communicated between two or more of flight controller 402a, motion planner 404, and dynamic route planner 406 directly, or via vehicle dynamics lookup 410. In some examples, data may also be communicated between one or more of flight controller 402a, motion planner 404, dynamic route planner 406 and mission manager 114 directly, or via vehicle dynamics lookup 410. For example, mission manager 114 may (1) communicate task and constraint data to dynamic route planner 406; and/or (2) communicate route and task data to motion planner 404. Dynamic route planner 406 may similarly provide route and task data to motion planner 404 based on data (e.g., constraints) received from vehicle dynamics lookup 410. Motion planner 404 may provide trajectory data to flight controller 402a based, at least in part, on sensor data received from sensing and perception module 414 and/or vehicle dynamics lookup 410. Vehicle dynamics lookup 410 may be further configured to receive data (e.g., mission urgency, fuel/cargo weight, etc.) from mission manager 114.

Although mission manager 114 is illustrated as being located outside of first aerial vehicle 102a, in some examples, first aerial vehicle 102a may include mission manager 114 within first command module 110a. Moreover, in some examples, the components of first command module 110a (e.g., flight controller 402a, motion planner 404, dynamic route planner 406, and/or vehicle dynamics lookup) illustrated in FIG. 4b may be located in a remote system communicatively coupled with first command module 110a. In some such examples, mission manager 114 and/or the components of first command module 110a may be a part of AAVNS 100. In other examples, mission manager 114 and/or the components of first command module 110a may be a part of a system other than AAVNS 100 but in communication with AAVNS 100 and/or one or more aerial vehicles of plurality of aerial vehicles 102.

In examples in which mission manager 114 is not located on first aerial vehicle 102a, mission manager 114 may be communicatively coupled with first aerial vehicle 102a via a communication system or module 412. In certain aspects, each aerial vehicle 102 of the plurality of the aerial vehicles 102 may serve as a communication node in the network (e.g., a mesh network) such that information between a first and second aerial vehicle 102a, 102b can be achieved using an intermediary third aerial vehicle 102c. In addition, in some examples, mission manager 114 may be communicatively coupled with one or more remotely situated systems or operators. For example, mission manager 114 may wirelessly communicate with a user interface device 408, remote server, first aerial vehicle 102a, second aerial vehicle 102b, or the like. In some examples, mission manager 114 may be configured to send data reflecting a mission payload, countermeasures, and/or other data to a ground crew (e.g., a user interface device, a cargo system, auxiliary system, etc.), or another system (e.g., a medical system). Similarly, mission manager 114 may be configured to receive sensor data from sensors indicating a ground threat, an obstacle, or any other sensor data described herein, such as, weather data, location data, obstacle data, mapping data, payload data, formation data, or landing data.

In examples in which mission manager 114 includes a mission sequencer, the mission sequencer may manage the overall behavior of AAVNS 100, including plurality of aerial vehicles 102. The mission sequencer can employ multiple state machines, one to manage the overall behavior of plurality of aerial vehicles 102 and the others to manage the commands issued by first command module 110a, a main operating base, combat outpost, user interface device, or the like. The mission sequencer may track waypoints where one or more aerial vehicles 102a through 102c are positioned, instigate communications with a combat outpost for landing negotiation, and instruct the route feeder to send a new route to the trajectory planner via the mission command, if needed. The mission sequencer may also communicate to the route feeder which route, or phase of the route, one or more of plurality of aerial vehicles 102 is performing (e.g., initialization and configuration, launch, en route, approach, etc.).

Mission manager 114 may also include a mission plan service to receive mission plan data for use by components of mission manager 114. Mission manager 114 is generally responsible for coordinating the major autonomous operations of one or more aerial vehicles of plurality of aerial vehicles 102, including: (a) sequencing the major autonomous operations of one or more aerial vehicles of plurality of aerial vehicles 102; (b) monitoring and feeding desired location information to a trajectory planner; and (c) requesting the automatic recalculation of the flight route upon significant deviations from the desired flight route or upon changes in the mission's area of operation (safe air volume). In other examples, however, a processor on board an aerial vehicle, such as first command module 110a on board first aerial vehicle 102a, may be configured to coordinate the major autonomous operations of one or more aerial vehicles of plurality of aerial vehicles 102 in addition to, or as an alternative to, mission manager 114.

An objective of the foregoing is to enable safe operation of plurality of aerial vehicles 102 during launch, cruise, and descent by making one or more of plurality of aerial vehicles 102 aware of the surrounding environment. Thus, an objective of AAVNS 100 may be to ensure a safe final approach and a stable touchdown, environmental awareness during launch and/or cruise, or the like. For example, AAVNS 100 perception may be configured to operate both in visually degraded and GPS-denied environments. Operation in visually degraded environments may also require sensors that penetrate obscurants, and GPS-denied operation will require employment of available sensors to achieve alternate methods of navigation. During cruise flight and during final approach, sensing and perception module 414 may be used to find obstacles such as buildings, trees, wires and towers that might not be known ahead of time. Third, sensing and perception module 414 may be used to estimate aerial vehicle position in the case of GPS denial or outage that could occur due to jamming or due to blockage by terrain.

Sensors (e.g., those used with first, second, third, and ground-based sensors 108a, 108b, 108c, 108d) may include one of numerous suitable sensors, such as one or more of light detection and ranging (LIDAR) 424, Radio Detection and Ranging (RADAR) 426, electro optical infrared (EO/IR) Imagers 428, a stereo vision camera system 438, radio altimeter (RADALT) 440, air data sensor 442, GPS/inertial navigation system (INS) 444, or the like.

In some examples, one or more of sensors includes RADAR 426. RADAR, such as forward-looking RADAR, may be used to provide low-resolution imaging through weather conditions and thick brownout conditions during landing. The forward-looking RADAR may be configured to detect or measure distance to objects impeding the predetermined flight path.

In some examples, one or more of sensors includes EO/IR 428. Passive Electro Optical Infrared (EO/IR) Imagers may be generally used for navigation in GPS-denied environments, for terrain analysis and detection of water and vegetation.

In some examples, one or more of sensors includes stereo vision camera system 438. Stereo vision camera system 438 may employ two cameras, displaced horizontally from one another, to obtain two differing views on of the area (e.g., the area within a field of view of one or more of plurality of aerial vehicles 102). By comparing these two images, the relative depth information can be obtained in the form of a disparity map, which encodes the difference in horizontal coordinates of corresponding image points. The values in this disparity map are inversely proportional to the scene depth at the corresponding pixel location.

In some examples, one or more of sensors includes GPS/INS device 444. When available, a GPS/INS device 444 may be used to provide latitude and longitude information, as well as altitude. GPS/INS device 444 uses GPS satellite signals to correct or calibrate a solution from an INS. The GPS gives an absolute drift-free position value that can be used to reset the INS solution, or can be blended with the INS by use of a mathematical algorithm, such as a Kalman Filter. The angular orientation of the unit can be inferred from the series of position updates from the GPS. The change in the error in position relative to the GPS can be used to estimate the unknown angle error. The benefits of using GPS with an INS are that the INS may be calibrated by the GPS signals and that the INS can provide position and angle updates at a quicker rate than GPS. For high dynamic vehicles, such as missiles and aircraft, INS fills in the gaps between GPS positions. Additionally, GPS may lose its signal and the INS can continue to compute the position and angle during the period of lost GPS signal.

If the GPS/INS device 444 is unavailable (e.g., a GPS-Denied Operation), which may be due to poor reception or a malfunction, AAVNS 100 remains functional where GPS signals are interrupted; for example, due to active jamming or shadowing from terrain. In one example, AAVNS 100 may navigate plurality of aerial vehicles 102 using visual landmarks for navigation. Specifically, satellite maps of the area along with digital terrain evaluation data (DTED) may be used to determine salient features offline. Thus, one or more databases, which may be stored to a memory/data storage device, may be used to store information related to, without limitation, DTED, buildings and structures, geographical maps, and/or any other information that may be used to assist in navigating plurality of aerial vehicles. During a mission, sensor data may be compared to the maps to produce a navigation solution.

AAVNS 100 may include or may be operatively coupled with one or more communication transceivers, which may be used to wirelessly communicate data signals between one or more of AAVNS 100, aerial vehicles 102a through 102c, mission manager 114, and/or a remote system. For example, a wireless communication device may be configured to communicate data (e.g., surveillance data, mission plan data, control signals, flight commands, flight paths, etc.) with the one or more remote systems. To facilitate optional wireless communication, one or more of plurality of aerial vehicles 102 may further comprise an air communication link enabled to transmit ("TX") and receive ("RX") data using one or more antennas (e.g., top and bottom). The antenna may be controlled via a processor (e.g., command modules 110a-110c) that is operatively coupled to a radio frequency (RF) switch. Thus, data collected or created by AAVNS 100 may be communicated with a remote system and/or any other device capable of wired or wireless communication using either a wired communication link or a wireless communication link.

As discussed above, first command module 110a of first aerial vehicle 102a may be configured to send control signals to second command module 110b of second aerial vehicle 102b. Thus, first command module 110a may be configured to send the control signals to second command module 110b via communication module 412. Additionally, or alternatively, first command module 110a may said other data or information to second command module 110b via communication module 412. Moreover, first command module 110a may be configured to send control signals or other information to one or more other vehicles of plurality of aerial vehicles 102 in addition to, or as an alternative to, second command module 110b.

In some examples, second aerial vehicle 102b, third aerial vehicle 102c, and any other aerial vehicles of plurality of aerial vehicles 102 may be the same or substantially the same as first aerial vehicle 102a depicted in FIG. 4. Thus, for the sake of a concise description, aerial vehicles other than first aerial vehicle 102a of plurality of aerial vehicles 102 will not be described in detail herein. In other examples, however, aerial vehicles of plurality of aerial vehicles 102 may be different than first aerial vehicle 102a. As one example, another aerial vehicle of plurality of aerial vehicles may not include dynamic route planner 406, motion planner 404, and/or flight controller 402a. In such examples, the aerial vehicle may receive control signals including flight commands or flight paths from another aerial vehicle of plurality of aerial vehicles 102 or from mission manager 114.

AAVNS 100 may be provided with modular, platform-agnostic processors, sensors 108, and software that can be adapted to various aerial vehicles and missions, thus lowering total ownership costs and the time needed to integrate developed technology into fielded systems. Current solutions for complex architectures rely on a series of point-to-point devices, each with specialized interfaces. To lower the number of components in these systems, many functions are usually combined within one device using tightly coupled code developed for specific hardware, operating systems, applications, and target platforms. Traditional architectures require significant time and capital resources to integrate, certify, and upgrade while limiting life-cycle maintenance to one prime integrator. AAVNS 100, however, would benefit from an improved architecture that allows functional modules to be interoperable with clearly defined interfaces. In addition, AAVNS 100 may be able to support health monitoring, diagnostics, and restarting of failed computer processes during the mission, all without the involvement of an onboard crew.

In some examples, such as a optionally-piloted aircraft, interaction with plurality of aerial vehicles 102 via user interface device 408 may be achievable with minimal equipment and infrastructure so that field personnel can request services from an aircraft equipped with AAVNS 100 for humanitarian relief operations, noncombatant evacuations, routine cargo resupply, underway replenishment, irregular warfare, sustained conventional combat, or any other mission. This interface may be intuitive and oriented around the tasks done during the mission. In some cases, it may be essential that the aerial vehicle not depend on an operator to land since it might be directed to a location with no ground personnel or communication. Hence, the most useful role of the operator during the critical landing phase may be to enhance safety, allowing the complete human-machine system to perform at a higher level of capability than the machine or a human pilot on his or her own. Human-system interaction may also enable a level of redundancy in case the onboard systems fail or their performance may be degraded.

Figure 5:
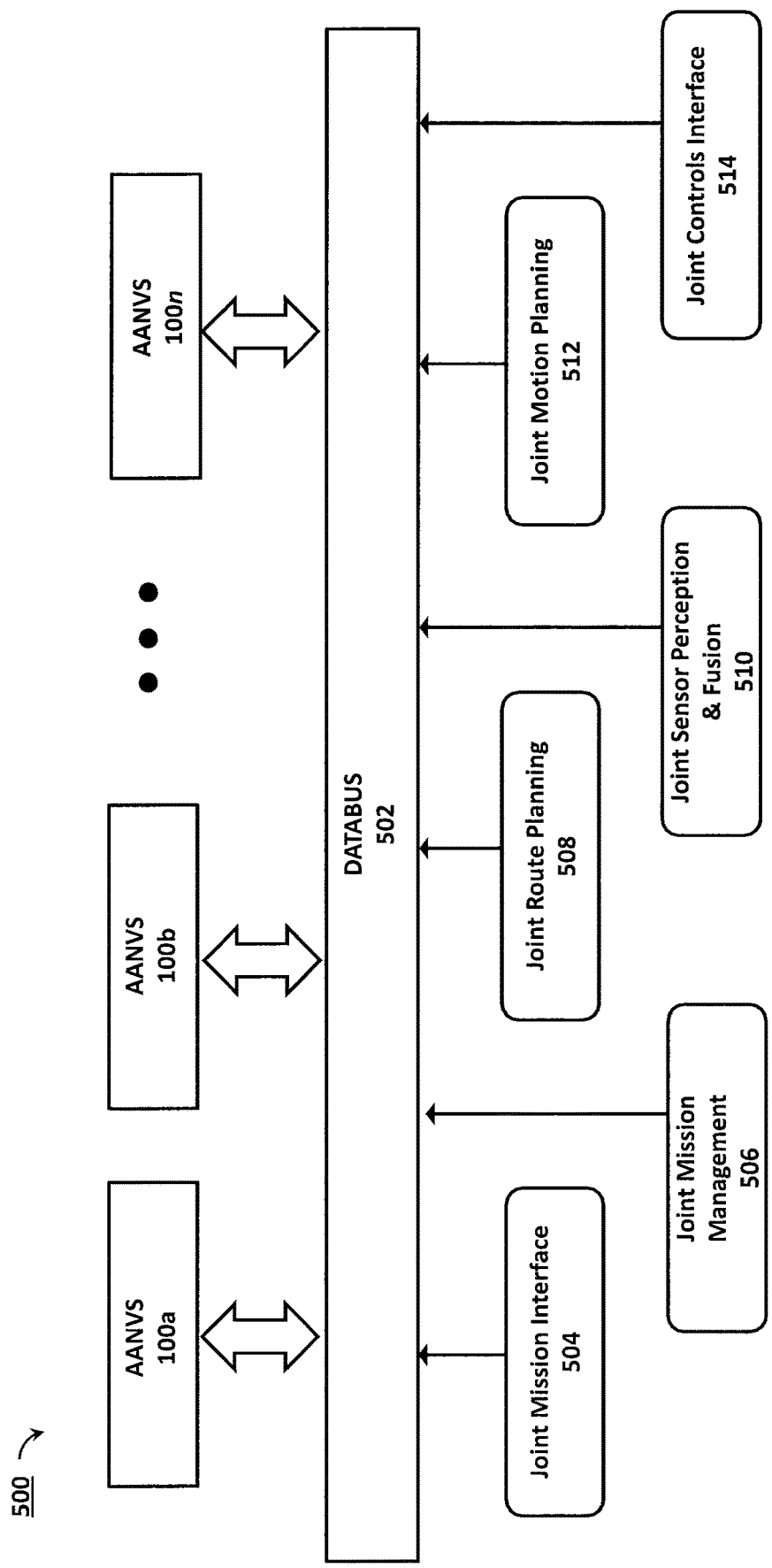
FIG. 5 is a block diagram illustrating an example joint mission planning system including two or more aerial vehicle navigation systems.

FIG. 5 is a block diagram illustrating an example system architecture 500 including two or more AAVNSs 100a-100n. In some examples, one or more autonomous aerial vehicle navigation systems 100 may be configured to be operated, controlled, and/or communicatively coupled to at least one other AAVNS 100. In such examples, each AAVNS 100 may include a plurality of aerial vehicles 102, or a fleet of aerial vehicles 102, as described above. In some such examples, each AAVNS 100 may be operated in concert with or in view of one or more other AAVNS 100. In turn, redundant missions or unnecessary missions may be avoided, the systems may be less expensive, and the missions may be completed in a more efficient manner. For example, rather than AAVNS 100a completing a single mission and AAVNS 100b completing a single mission near the other mission, a component of the system architecture 500 may determine that it would cheaper, more efficient, or the like to send AAVNS 100 one mission to complete both tasks rather than sending two different AAVNSs 100a, 100b to complete the two tasks.

System architecture 500 includes a plurality of functional modules configured to control the two or more AAVNSs 100a-100n. In some examples, system architecture 500 includes a joint mission interface module 504, a joint mission management module 506, a joint route planning module 508, joint sensor perception and fusion module 510, joint motion planning module 512, and joint controls interface 514. Joint mission management module 506, joint route planning module 508, joint sensor perception and fusion module 510, and joint motion planning module 512 may be similar to mission manager 114, dynamic route planner 406, sensing and perception module 414, and motion planner 404, respectively, as described with respect to FIG. 3 but may perform the functional tasks in view of sensor data, flight information, and the like from each of AAVNS 100a-100n. Thus, each of the functional modules of may be configured to generate, send, and/or receive control signals, sensor data, or other information from each of AAVNS 100a-100n such that system architecture 500 can determine efficient and inexpensive plans to navigate each plurality of aerial vehicles of each AAVNS 100a-100n. In some examples, joint mission interface module 504 may receive the mission requests for each AAVNS 100a-100n and may allocate, organize, monitor, or schedule missions in view of metrics of each AAVNS 100a-100n, such as location, fuel levels, cost to operate, number of missions to be completed, or the like. Joint controls interface 514 may be configured to control operation of each AAVNS 100a-100n. For example, joint controls interface 514 may be configured to instruct AAVNSs 100a-100n to perform certain missions. As another example, in some cases, system architecture 500 may be configured to generate control signals, flight commands, or flight paths for one or more aerial vehicles associated with AAVNSs 100a-100n. Thus, AAVNS 100a-100n and joint mission interface module 504, joint mission management module 506, joint route planning module 508, joint sensor perception and fusion module 510, and joint motion planning module 512, and joint controls interface 514 may be communicatively coupled with a databus 502. In some examples, databus 502 may include a DDS open standard data bus. In other examples, databus 502 may include any other suitable databus.

Figure 6:
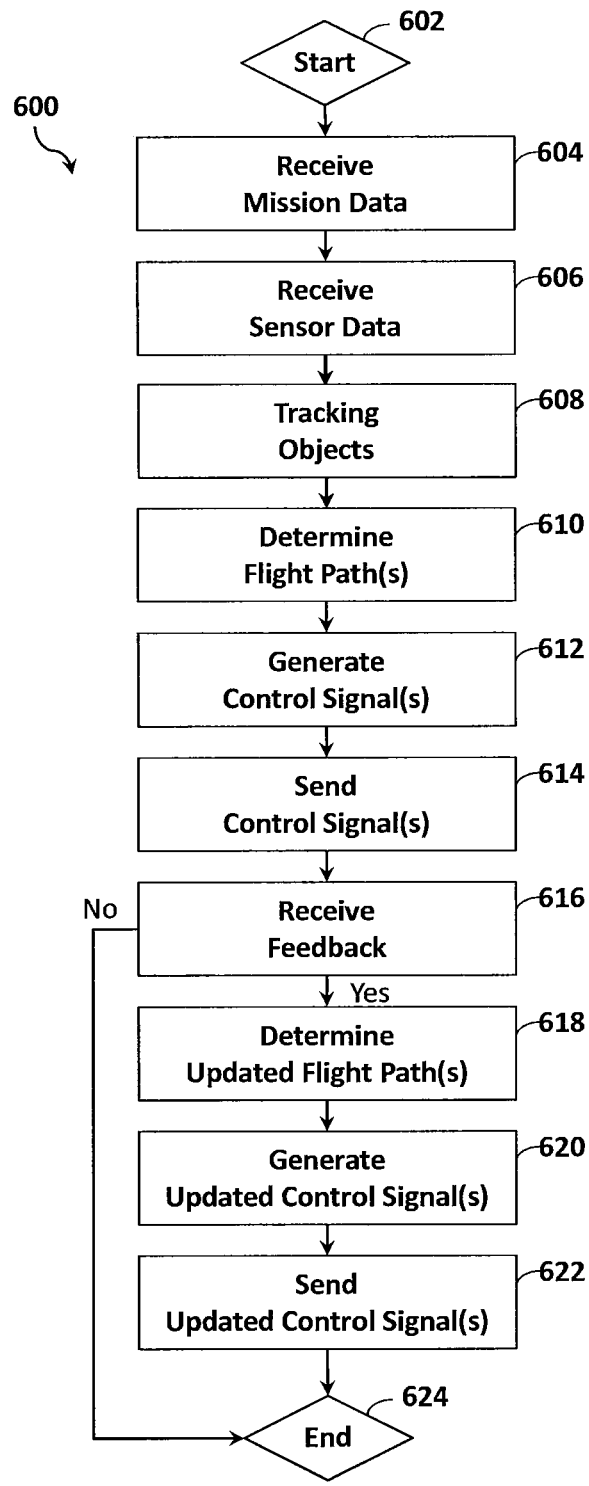
FIG. 6 is a flow diagram illustrating an example method of operating a plurality of aerial vehicles in an environment.

FIG. 6 is a flow diagram illustrating an example method 600 of operating a plurality of aerial vehicles 102 of AAVNS 100 in environment 118. The method of FIG. 6 will be described with respect to AAVNS 100 of FIG. 2a for ease of description only. In other examples, additional or alternative systems, vehicles, or components may be used to perform the method of FIG. 6.

Upon starting at step 602, first command module 110a or mission manager 114 may receive mission data at step 604. In some such examples, the mission data may be received from a user input device. The first command module 110a may receive sensor data reflecting one or more characteristics of environment 118 at step 606. For example, first aerial vehicle 102a may be navigating along first flight path 104a and receive sensor data generated by first sensors 108a on board first aerial vehicle 102a. Such sensor data may include weather data, location data, obstacle data, mapping data, payload data, formation data, landing data, or the like. In some examples, first command module 110a may track an object at step 608. For instance, first command module 110a may track a position of second aerial vehicle 102b, third aerial vehicle 102c, and/or another object at step 608. While the example method 600 illustrates receiving sensor data (step 606) after receiving mission data (step 604), one of skill in the art would appreciate that order of these steps may be rearranged (e.g., depending on the order in which the data becomes available or other design needs of the system).

At step 610, first command module 110a may determine or change (e.g., alter or correct) one or more flight paths (e.g., original flight paths). The first command module 110a may determine the one or more flight paths based at least in part on pre-flight mission data, including route information, known weather condition, known vehicle state (e.g., fuel level, damage, battery state of charge, etc.), which can be altered or corrected based at least in part on the sensor data. For example, first command module 110a may determine second flight path 104b for second aerial vehicle 102b and/or third flight path 104c for third aerial vehicle based at least in part on the sensor data. In some examples, first command module 110a may generate the flight paths based on the mission data and/or tracked object data in addition to, or as alternative to, the sensor data. After generating the one or more flight paths, first command module 110a may generate control signals reflecting the one or more flight paths at step 612. For example, in examples in which first command module 110a determined second flight path 104b for second aerial vehicle 102b, first command module 110a may generate control signals reflecting second flight path 104b. In such examples, first command module 110a of first aerial vehicle 102a may send the control signals to second command module 110b of second aerial vehicle 102b at step 614. In some examples, first command module may send the control signals to second aerial vehicle 102b via mission manager 114. As another example, in examples in which first command module 110a determined third flight path 104c for third aerial vehicle 102c, first command module 110a may generate control signals reflecting third flight path 104c and may send the control signals to third command module 110c of third aerial vehicle 102c at step 614. In some examples, first command module 110a may send the control signals to third aerial vehicle 102c via second aerial vehicle 102b or mission manager 114.

In yet another example, first command module 110a may generate control signals to autonomously maneuver second aerial vehicle 102b to follow first aerial vehicle 102a and/or to control autonomous third aerial vehicle 102c to follow second aerial vehicle 102b. In a further example, first command module 110a may generate control signals to autonomously maneuver second aerial vehicle 102b and third aerial vehicle 102c to maintain a predetermined aerial formation relative to the first aerial vehicle 102a. Moreover, first command module 110a may send a flight command to one or both of second aerial vehicle 102b or third aerial vehicle 102c to divert second aerial vehicle 102b from second flight path 104b or third aerial vehicle 102c from third flight path 104c to follow an modified flight path. In such examples, first command module 110a may send a second flight command to instruct second aerial vehicle 102b to return to second flight path 104b and/or third aerial vehicle 102c to return to third flight path 104c. As still another example, first command module may generate zone data that indicates one or more landing zones 112 proximate second flight path 104b and send said zone data to second aerial vehicle 102b. In some cases, first command module 110a may send an alert signal to one or more of plurality of aerial vehicles 102 to instruct the one or more of plurality of aerial vehicles to follow a dispersion pattern flight path 122 that is different than the current flight path (e.g., different than second or third flight path 104b, 104c). First command module 110a may then send a termination alert to cause the one or more aerial vehicles of plurality of aerial vehicles to return to the previous flight path (e.g., second or third flight path 104b, 104c).

In some examples, at step 616, first command module 110a may receive feedback from at least one of second aerial vehicle 102b or third aerial vehicle 102c after sending the respective control signals. For example, the first command module 110a determines an updated flight path (e.g., first updated flight path 106a) for the second aerial vehicle 102b, for changing to from a predetermined formation 126a to a different formation 126c, based at least in part on the feedback. In such examples, first command module 110a may determine an updated flight path for the second or third aerial vehicle 102b, 102c based at least in part on the sensor data and the received feedback at step 618. The feedback may reflect, for example, a state of an aerial vehicle (e.g., fuel status, maintenance status, damage, etc.), which may then be used as a factor to determine the updated flight path. Indeed, a given flight path may not be feasible based on the current state of any aerial vehicle. For example, if the amount of fuel on the aircraft is inadequate for the flight path, an updated flight path may be determined that requires less fuel. Similarly, if there is damage to the aerial vehicle that prohibits the aerial vehicle from making certain maneuvers, an updated flight path may be determined that avoids such maneuvers. The state of any aerial vehicle damage may be determined, for example, using on-board sensors (e.g., health monitoring sensors), performance data, or observed data from other aerial vehicles. For example, an aerial vehicle may observe (e.g., via an optical sensor) damage to another aerial vehicle.

At step 620, first command module 110a may then generate updated control signals reflecting the updated flight path for one or both of second aerial vehicle 102b or third aerial vehicle 102c. First command module 110a of first aerial vehicle 102a then sends the updated control signals to the respective second or third aerial vehicle 102b, 102c at step 622. If the mission is complete at step 622 or if first command module 110a does not receive feedback from any other aerial vehicles of the plurality of aerial vehicles 102, the method may end at step 624. In other examples, the method may repeat until the mission is completed. As noted above, in some examples, second command module 110b may receive control signals including a second flight command from first command module 110a to return second aerial vehicle 102b (or another one of said plurality of aerial vehicles 102) from modified flight path back to the original flight path (e.g., once clear of an obstacle 132). To that end, the second command module can received from the first command module a second flight command to return the second aerial vehicle 102c from the second flight path to the flight path associated with the predetermined formation 126a.

Figure 7:
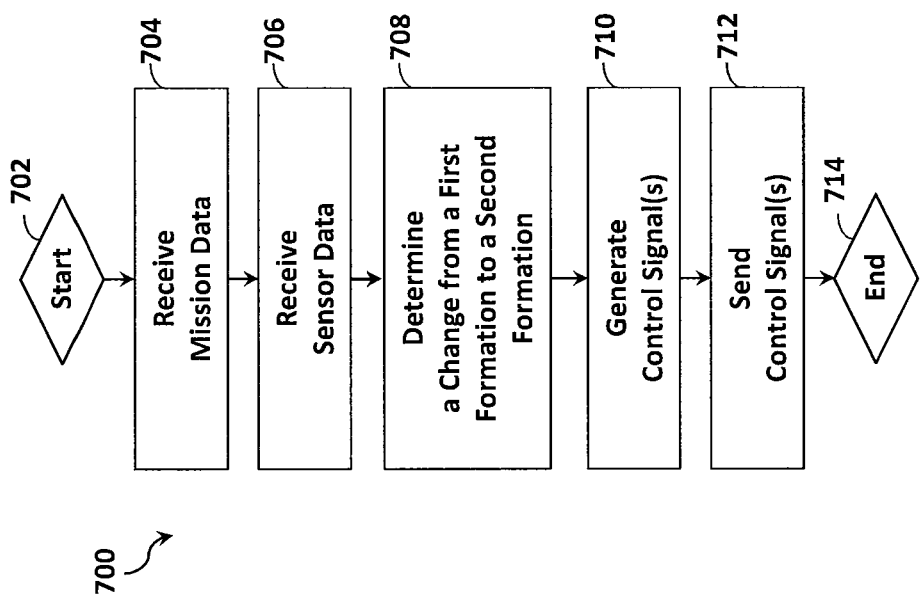
FIG. 7 is a flow diagram illustrating another example method of operating a plurality of aerial vehicles in an environment.

FIG. 7 is a flow diagram illustrating another example method 700 of operating a plurality of aerial vehicles 102 of AAVNS 100 in environment 118. The method of FIG. 7 will be described with respect to AAVNS 100 of FIG. 2a for ease of description only. In other examples, additional or alternative systems, vehicles, or components may be used to perform the method of FIG. 7.

Upon starting at step 702, first command module 110a or mission manager 114 receives mission data at step 706. In some such examples, the mission data may be received from a user input device or mission manager 114. In some examples, first command module 110a receives sensor data reflecting one or more characteristics of environment 118 at step 704. In an example, first aerial vehicle 102a may be navigating along first flight path 104a and receives sensor data generated by first sensors 108a on board first aerial vehicle 102a. Such sensor data may include weather data, location data, obstacle data, mapping data, payload data, formation data, landing data, or the like.

At step 708, first command module 110a determines a change from a predetermined formation 126a to a different formation 126c for second aerial vehicle 102b based at least in part of the sensor data. In some examples, the predetermined formation 126a and different formation 126c for second aerial vehicle 102b may be relative to first aerial vehicle 102a. At step 710, first control module 110a generates control signals reflecting the change from the predetermined formation 126a to the different formation 126c and sends said control signals to second aerial vehicle 102b at step 712. In some examples, method 700 may end at step 714 after the control signals are sent to second aerial vehicle 102b. In other examples, method 700 may be repeated until a mission is completed. In such examples, first command module 110a may determine multiple changes in predetermined formations, generate control signals based on the changes, and send those control signals to second aerial vehicle 102b.

Figure 8:
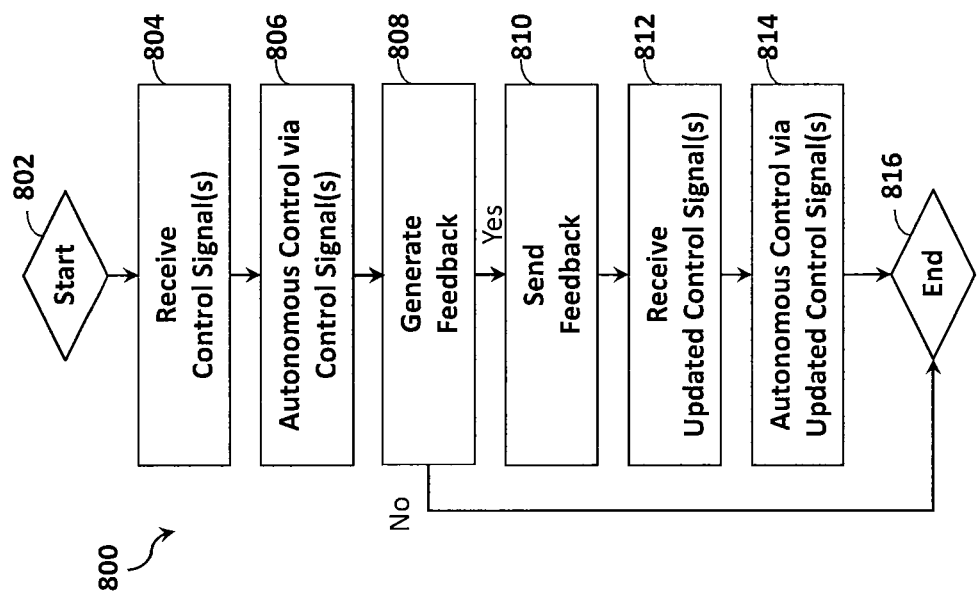
FIG. 8 is a flow diagram illustrating an example method of operating a second or a third aerial vehicle of autonomous aerial vehicle navigation system in an environment.

FIG. 8 is a flow diagram illustrating an example method 800 of operating second or third aerial vehicle 102b, 102c of AAVNS 100 in environment 118. The method of FIG. 8 will be described with respect to the architecture of FIG. 4a for ease of description only. For example, in operation, the mission management system 448 of the first command module 110a of first aerial vehicle 102a can instruct the flight controller 402b of the second aerial vehicle 102b to send control signals to its flight component (e.g., control surfaces, motors, engines, etc.). The mission management system 448 is configured to receive feedback from second command module 110b and/or third command module 110c, which may be used as a sensor input to update the control signals. In other examples, additional or alternative systems, vehicles, or components may be used to perform the method of FIG. 8. Moreover, although the method of FIG. 8 is mainly described with respect to second aerial vehicle 102b, operating third aerial vehicle 102c in accordance with the present disclosure may be the same or substantially the same as operating second aerial vehicle 102b according to method 800.

Upon start at step 802, second command module 110b of second aerial vehicle 102b receives control signals from first command module 110a of first aerial vehicle 102a at step 804. For example, the control signals may be generated based on information from the mission management system 448. After receiving the control signals, second command module 110b maneuvers second aerial vehicle 102b substantially along second flight path 104b based on the control signals at step 806. In some examples, second aerial vehicle 102b may generate feedback at step 808 and send said feed to first aerial vehicle 102a at step 810. For example, the second aerial vehicle 102b may send the feedback to the mission management system 448, either directly or via a relay (e.g., another aerial vehicle). At step 812, in some examples, second command module 110b may receive updated control signals from first aerial vehicle 102a, which may be generated by the mission management system 448. In such examples, second command module 110b may autonomously maneuver second aerial vehicle 102b based on the received updated control signals at step 814. If the mission is complete at step 814 or if second command module 110b does not generate feedback at step 808, the method may end at step 816. In other examples, the method may repeat until the mission is completed.

While particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law. It will be appreciated that the methods and systems described above are set forth by way of example and not of limitation. Numerous variations, additions, omissions, and other modifications will be apparent to one of ordinary skill in the art.

What is claimed is:

1. A method of operating a plurality of aerial vehicles in an environment, the method comprising:
    receiving, at a first command module on board a first aerial vehicle navigating along a first flight path, sensor data from one or more sensors comprising a forward-facing optical sensor and a rear-facing optical sensor on board the first aerial vehicle, wherein the sensor data reflects one or more characteristics of the environment, and wherein at least one of the forward-facing optical sensor or rear-facing optical sensor comprises a light detection and ranging (LIDAR) sensor;
    receiving, at the first command module, additional sensor data from one or more additional sensors on board a second aerial vehicle that are different from the one or more sensors, wherein the additional sensor data reflects information about a position of the first aerial vehicle such that the second aerial vehicle can track the position of the first aerial vehicle;
    determining, via the first command module, a change from a predetermined formation to a different formation for the second aerial vehicle based at least in part on the sensor data and the additional sensor data, wherein the predetermined formation and the different formation are relative to the first aerial vehicle;
    generating, via the first command module, control signals reflecting the change from the predetermined formation to the different formation;
    sending the control signals from the first aerial vehicle to the second aerial vehicle;
    tracking, via a second command module on board the second aerial vehicle, the position of the first aerial vehicle to yield a tracked position;
    maneuvering, via the second command module, the second aerial vehicle to follow the first aerial vehicle based on the control signals and the tracked position of the first aerial vehicle;
    receiving, via the second command module and from the first command module, zone data that indicates one or more zones,
        wherein the zone data includes a time component reflecting a validity period or an expiration time; and
    maneuvering, via the second command module, the second aerial vehicle to enter the one or more zones based at least in part on the zone data.

2. The method of claim 1, further comprising the step of:
    determining, via the first command module or a mission manager, a second flight path for a second aerial vehicle reflecting the change from the predetermined formation to the different formation, wherein the control signals reflect the second flight path for the second aerial vehicle.

3. The method of claim 2, further comprising the steps of:
    receiving, at the first command module, feedback from the second aerial vehicle; and
    determining, via the first command module, an updated flight path for the second aerial vehicle, for changing to the different formation, based at least in part on the feedback.

4. The method of claim 2, further comprising the step of:
maneuvering, via a second command module of the second aerial vehicle, the second aerial vehicle to navigate along the second flight path.

5. The method of claim 4, wherein the control signals comprise a first flight command to divert the second aerial vehicle from a flight path associated with the predetermined formation and to follow the second flight path, the method further comprising the steps of:
maneuvering, via the second command module of the second aerial vehicle, the second aerial vehicle to navigate along the second flight path; and
receiving, via the second command module and from the first command module, a second flight command to return the second aerial vehicle from the second flight path to the flight path associated with the predetermined formation.

6. The method of claim 4, further comprising the steps of:
receiving, via the second command module, an alert signal;
initiating, via the second command module, a dispersion pattern flight path, wherein the dispersion pattern flight path is different than the second flight path;
maneuvering, via the second command module of the second aerial vehicle, the second aerial vehicle to navigate along the dispersion pattern flight path; and
receiving, via the second command module, a termination alert, wherein the termination alert causes the second command module to instruct the second aerial vehicle to return to the second flight path.

7. The method of claim 1, wherein the different formation is a second predetermined formation relative to the first aerial vehicle that is different from the predetermined formation.

8. The method of claim 1, wherein the sensor data comprises at least one of weather data, location data, obstacle data, mapping data, payload data, formation data, and landing data.

9. The method of claim 1, wherein the control signals are configured to enable autonomous control of the second aerial vehicle and a third aerial vehicle to maintain the different formation, wherein the different formation is a predetermined aerial formation relative to the first aerial vehicle.

10. An autonomous aerial vehicle navigation system for operating a plurality of aerial vehicles in an environment, the autonomous aerial vehicle navigation system comprising:
one or more sensors configured to generate sensor data reflecting one or more characteristics of the environment, wherein the one or more sensors comprise a forward-facing optical sensor and a rear-facing optical sensor and are on board a first aerial vehicle, and wherein at least one of the forward-facing optical sensor or rear-facing optical sensor comprises a light detection and ranging (LIDAR) sensor;
a first command module disposed on board the first aerial vehicle and configured to:
receive additional sensor data from one or more additional sensors on board a second aerial vehicle that are different from the one or more sensors, wherein the additional sensor data reflects information about a position of the first aerial vehicle such that the second aerial vehicle can track the position of the first aerial vehicle;
determine a change from a predetermined formation to a different formation for the second aerial vehicle based at least in part on the sensor data and the additional sensor data, wherein the predetermined formation and different formation are relative to the first aerial vehicle;
generate control signals reflecting the change from the predetermined formation to the different formation; and
send the control signals from the first aerial vehicle to the second aerial vehicle; and
a second command module on board the second aerial vehicle and configured to:
track the position of the first aerial vehicle to yield a tracked position;
receive zone data that indicates one or more zones, wherein the zone data includes a time component reflecting a validity period or an expiration time; and
maneuver the second aerial vehicle to follow the first aerial vehicle based on the control signals and the tracked position of the first aerial vehicle; and
maneuver the second aerial vehicle to enter the one or more zones based at least in part on the zone data.

11. The autonomous aerial vehicle navigation system of claim 10, further comprising:
a mission manager, wherein the first command module or the mission manager is configured to determine a second flight path for the second aerial vehicle reflecting the change from the predetermined formation to the different formation, wherein the control signals reflect the second flight path for the second aerial vehicle.

12. The autonomous aerial vehicle navigation system of claim 11, wherein at least one of the first command module or mission manager is further configured to:
receive feedback from the second aerial vehicle; and
determine an updated flight path for the second aerial vehicle, for changing to the different formation, based at least in part on the feedback.

13. The autonomous aerial vehicle navigation system of claim 11, wherein the control signals comprise a first flight command to divert the second aerial vehicle from a flight path associated with the predetermined formation and to follow the second flight path, and wherein the second command module is configured to:
maneuver the second aerial vehicle to navigate along the second flight path; and
receive, from the first command module, a second flight command to return the second aerial vehicle from the second flight path to the flight path associated with the predetermined formation.

14. The autonomous aerial vehicle navigation system of claim 11, wherein the second command module is further configured to:
receive an alert signal;
initiate a dispersion pattern flight path, wherein the dispersion pattern flight path is different than the second flight path;
maneuver the second aerial vehicle to navigate along the dispersion pattern flight path; and
receive a termination alert, wherein the termination alert causes the second command module to instruct the second aerial vehicle to return to the second flight path.

15. The autonomous aerial vehicle navigation system of claim 10, wherein the change from the predetermined formation to the different formation comprises a first change, wherein the first command module is further configured to:
determine a second change from the predetermined formation to the different formation for a third aerial vehicle based at least in part on the sensor data, wherein the second change is different than the first change;

generate second control signals reflecting the second change from the predetermined formation to the different formation; and send the second control signals from the first aerial vehicle to the third aerial vehicle.

16. The autonomous aerial vehicle navigation system of claim 15, wherein the control signals are configured to enable autonomous control of the second aerial vehicle and the third aerial vehicle to maintain the different formation, wherein the different formation is a predetermined aerial formation relative to the first aerial vehicle.

17. A communication system for use in operating a plurality of aerial vehicles including a first aerial vehicle in an environment, the communication system comprising:

a first command module on board the first aerial vehicle configured to:

receive, at the first command module, sensor data from one or more sensors comprising a forward-facing optical sensor and a rear-facing optical sensor on board the first aerial vehicle, wherein the sensor data reflects one or more characteristics of the environment, and wherein at least one of the forward-facing optical sensor or rear-facing optical sensor comprises a light detection and ranging (LIDAR) sensor;

receive additional sensor data from one or more additional sensors on board a second aerial vehicle that are different from the one or more sensors, wherein the additional sensor data reflects information about a position of the first aerial vehicle such that the second aerial vehicle can track the position of the first aerial vehicle;

determine a change from a predetermined formation to a different formation for the second aerial vehicle based at least in part on sensor data and the additional sensor data, wherein the predetermined formation and the different formation are relative to the first aerial vehicle, and wherein the sensor data reflects one or more characteristics of the environment, generate control signals reflecting the change from the predetermined formation to the different formation, and send the control signals from the first aerial vehicle to a second command module of the second aerial vehicle; and the second command module, wherein the second command module is configured to:

receive the control signals, maneuver the second aerial vehicle to navigate along a flight path, track the position of the first aerial vehicle to yield a tracked position, maneuver the second aerial vehicle to follow the first aerial vehicle based on the control signals and the tracked position of the first aerial vehicle, receive zone data that indicates one or more zones, wherein the zone data includes a time component reflecting a validity period or an expiration time, and maneuver the second aerial vehicle to enter the one or more zones based at least in part on the zone data.

18. The communication system of claim 17, further comprising a mission manager, wherein the first command module is configured to send the control signals to the second command module via the mission manager.

19. The communication system of claim 18, wherein at least one of the first command module, the second command module, or the mission manager is configured to:

generate, based on the control signals, the flight path for the second aerial vehicle reflecting the change from the predetermined formation to the different formation.

20. The communication system of claim 18, wherein at least one of the first command module or the mission manager is further configured to:

receive feedback from the second command module; and determine an updated flight path for the second aerial vehicle, for changing to the different formation, based at least in part on the feedback.

21. The communication system of claim 17, wherein the control signals comprise at least one of:

a flight command to divert the second aerial vehicle from the flight path and follow an modified flight path, an alert signal to initiate a dispersion pattern flight path, a termination alert to instruct the second aerial vehicle to return to the flight path, or one of the one or more zones, wherein the second command module is further configured to:

maneuver the second aerial vehicle to navigate based on the flight command, alert signal, termination alert, or zone data.

* * * * *